US010112713B2

(12) United States Patent
Tyler et al.

(10) Patent No.: US 10,112,713 B2
(45) Date of Patent: Oct. 30, 2018

(54) BACK MOUNTED FLIGHT MACHINE

(71) Applicants: Nelson Tyler, Van Nuys, CA (US); David Mayman, Los Angeles, CA (US)

(72) Inventors: Nelson Tyler, Van Nuys, CA (US); David Mayman, Los Angeles, CA (US)

(*) Notice: Subject to any disclaimer, the term of this patent is extended or adjusted under 35 U.S.C. 154(b) by 142 days.

(21) Appl. No.: 15/191,429

(22) Filed: Jun. 23, 2016

(65) Prior Publication Data
US 2017/0015419 A1 Jan. 19, 2017

Related U.S. Application Data

(60) Provisional application No. 62/293,290, filed on Feb. 9, 2016, provisional application No. 62/249,794, filed on Nov. 2, 2015, provisional application No. 62/185,178, filed on Jun. 26, 2015.

(51) Int. Cl.
B64C 39/02 (2006.01)
B64D 17/40 (2006.01)
(52) U.S. Cl.
CPC ............ *B64C 39/026* (2013.01); *B64D 17/40* (2013.01)

(58) Field of Classification Search
CPC ............................. B64C 39/026; B64D 17/40
See application file for complete search history.

(56) References Cited

U.S. PATENT DOCUMENTS

| 3,023,980 | A | * | 3/1962 | Martin | B64C 39/026 244/4 A |
| 3,443,775 | A | * | 5/1969 | Williams | B64C 39/026 244/4 A |
| 4,379,532 | A | * | 4/1983 | Dmitrowsky | B64C 39/026 244/4 A |
| 5,779,188 | A | * | 7/1998 | Frick | B64C 39/026 244/12.5 |
| 2009/0020645 | A1 | * | 1/2009 | Cacciaguerra | B29C 70/32 244/119 |

* cited by examiner

Primary Examiner — Nicholas McFall
(74) Attorney, Agent, or Firm — Colin P. Abrahams

(57) ABSTRACT

A back mounted flight machine comprises a frame comprising a connecting bracket, a pair of lateral arms extending from the connector bracket, and an engine mounted on each of the lateral arms in a selected position. A harness is mounted on the connecting bracket of the frame between the pair of lateral arms. Further, a fastening mechanism is provided for connecting the harness to the connecting bracket to permit relative movement between the harness and the frame in a plurality of orientations.

18 Claims, 26 Drawing Sheets

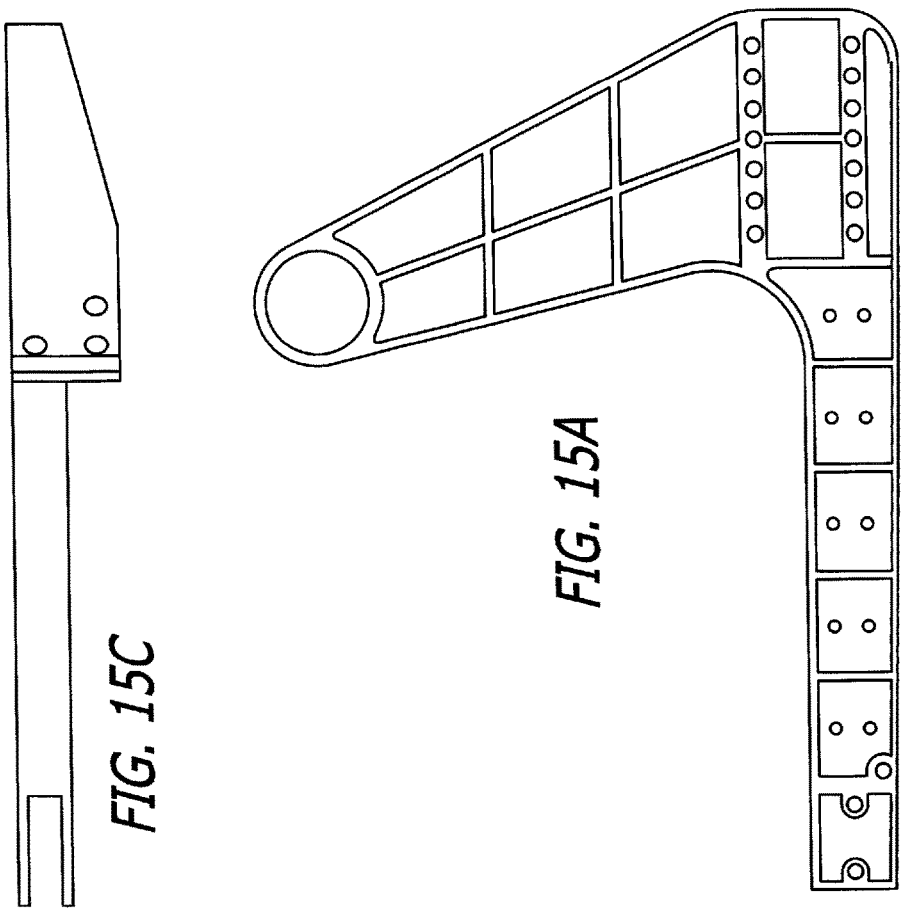
FIG. 15A
FIG. 15C
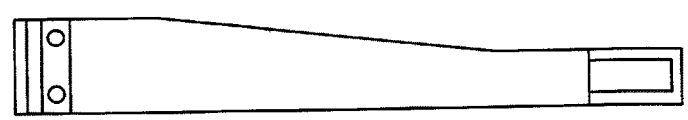
FIG. 15B
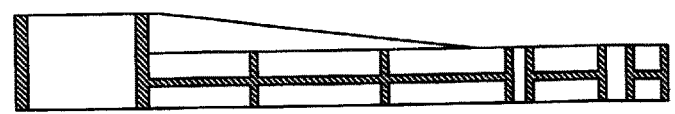
FIG. 15D

BACK MOUNTED FLIGHT MACHINE

CROSS REFERENCE TO RELATED APPLICATIONS

This application claims the benefit of U.S. Provisional Patent Application No. 62/185,178 filed Jun. 26, 2015, U.S. Provisional Patent Application No. 62/249,794 filed Nov. 2 2015, and U.S. Provisional Patent Application No. 62/293,290 filed Feb. 9, 2016, all of which are incorporated herein in their entirety.

FIELD AND BACKGROUND OF THE INVENTION

This invention relates to a back mounted flight machine. Such a machine is sometimes also referred to as a jet pack, and comprises a harness which is attached to the back and shoulders of a user or pilot, the harness supporting a frame for engines, controls, fuel tanks and other components.

The back mounted flight machine in accordance with the invention attaches to the user or pilot. The user or pilot is able through various mechanisms of control to orient the machine in different positions so as to determine and regulate the direction of flight, or enable the machine to substantially hover in a single location, and also to adjust and modulate the thrust, force and orientation of the engines to control ascent and descent before and during flight.

Various types and configurations of back mounted flight machines have been developed over the years, and all of these devices have needed to address and improve upon parameters such as weight, engine location, engine type, pilot control, fuel tank size and position, in order to create a device which is both safe and easy to control by experienced pilots. An enduring issue with these flight devices relates to control and reduction of weight, as well as the amount of fuel stored and burned, so that the pilot is able to remain airborne for more than just short periods of time.

SUMMARY OF THE INVENTION

According to one aspect of the invention, there is provided a back mounted flight machine comprising: a frame comprising a connecting bracket, a pair of lateral arms extending from the connector bracket, and an engine mounted on each of the lateral arms in a selected and variable position; a harness mounted on the connecting bracket of the frame and between the pair of lateral arms; and a fastening mechanism for connecting the harness to the connecting bracket of the frame to permit relative movement between the harness and the frame in a plurality of orientations.

Preferably, the back mounted flight machine comprises a fuel tank attached to the harness. In one embodiment, each of the pair of lateral arms comprises a control arm to facilitate relative movement between the harness and the frame and a mounting arm for receiving the engine. Each of the pair of lateral arms may comprise a control arm and a mounting bracket for mounting the engine on the control arm.

In a preferred embodiment, each lateral arm has multiple points for connection of the engine so that the engine may be positioned at a selected and variable point along the lateral arm. The multiple points for connection may comprise a plurality of spaced apertures by means of which the engine can be bolted to the lateral arm. Further, an engine mounting bracket for mounting the engine to the lateral arm may be provided. The engine may be mounted to the engine mounting bracket at one of several mounting positions so that the distance between the engine and the lateral arm can be selectively varied. Further, the engine may be mounted to the engine mounting bracket in one of several mounting positions so that the engine may be vertically higher or lower relative to the lateral arm.

In one embodiment, the fastening mechanism comprises a pair of vertical brackets within the connecting bracket, a rod rotatably received by the vertical brackets, a fastening plate fixed to the harness, and a rod end having a first end rotatably secured to the rod and a second end connected to the fastening plate. The relative movement between the harness and the frame in a plurality of orientations may include movement wherein the frame and harness can move in a clockwise and counterclockwise direction relative to each other and in a fore and aft direction relative to each other.

Preferably, a control handle is formed at an end of each of the pair of lateral arms, the control handle facilitating engine control and relative orientation between the harness and the frame. The control handle may include a rotatable engine control post for controlling engine output. The control handle may also include an emergency switch for altering engine output, the emergency switch including a tie connectable to a pilot, such that selected movement of the hand of the pilot will cause the tie to activate the emergency switch. Additionally, the control handle may include a tab on an outer surface thereof, the tab cooperating with a spring-loaded arm for controlling thrust of the engine.

In one embodiment, the flight machine may comprise a pair of retractable barriers formed between the harness and the engines, the retractable barriers been movable between a first extended position between the harness and the engines, and a second retracted position. The flight machine may also comprise a retractable post for supporting the flight machine when on solid ground. There may also be a compartment for a stored parachute, wherein the parachute can be deployed in both emergency and non-emergency situations.

Each engine may comprise deflectors to facilitate control of direction of the flight machine, the deflectors being connected to a hand control device formed on the lateral arms by cables. Further, the hand control may be rotatable and calibrated such that thrust increases at a greater rate during the early stages of rotation of the hand control, and at a lesser rate once the flight device is airborne.

In one preferred embodiment, a cooling mechanism may be provided whereby oil is deposited at bearings within the engine after shut down but before engine rotation has ceased.

The present invention thus comprises a harness mounted to the back and shoulders of the pilot. A frame is mounted on the harness, and the location and type of mounting according to the present invention improves the ability to control and maneuver the flight machine with a greater degree of safety. The frame itself supports a fuel tank and at least two engines, in one embodiment. The frame preferably includes control arms extending forwardly of the harness so that the pilot's hands, and at least a part of his forearms, can comfortably and conveniently rest thereon and manipulate engine control and direct the flight with the control arms. In one form of the invention, there are two engines preferably located laterally of the pilot on the frame of the device. An embodiment of the invention requires that the respective engines be counter-rotating relative to each other so that the rotational forces of one engine may be substantially canceled by the rotational forces of the other, providing additional stability to the flights device.

In accordance with the invention, both of the engines are movable on the frame so that they can be optimally positioned thereon. Preferably, the engines can be adjusted so as to move to a more forward position, or a more rearward position. Furthermore, the invention provides that the engines may further be adjusted so as to move laterally more outwardly or laterally more inwardly. These movements are attainable based on the particular construction of the frame, and the manner in which the engines are mounted to the frame. A clear advantage of the ability to fine tune the position of the engines relative to the frame is that the size, weight, and weight distribution of the pilot can be factored in so that the location of the engines can be optimized based on these parameters.

As mentioned, the engines may be counter-rotating with respect to each other, and this leads to more stability since precession is significantly reduced or even substantially eliminated.

In accordance with a further aspect of the invention, the engines utilized with the flight device of the invention may have a mechanism incorporated therein for cooling the engines after they have been shut down (that is, the supply of fuel to the engine has been stopped). The engines may continue to spin in order to provide cooling after the engines have been switched off. Further, appropriate lubrication of bearings can take place in order to reduce wear on the bearing. This may also have the added effect of preventing a buildup of heat. The spinning of the engine may continue to push cool air through, and thereby cool heated components.

In accordance with a further aspect of the invention, the flight device of the invention may include a float, air bags, or the like which may pop-up or activate upon landing, such as in water. Thus, for example, after a predetermined amount of time, such as for example two seconds, sensors which sense the presence of water around the flight device will cause air bags to inflate, therefore causing the device to float. This may provide an additional safety factor to the pilot, as well as prevent the sinking of the device if it should land in water.

According to a further aspect of the invention, the fuel tank may incorporate a bladder therein, in which the fuel is held. A break in the tank would therefore not necessarily result in a fuel leakage, since an additional protective bladder for containing the fuel would provide a further barrier against such fuel leakage, unless the impact which may cause breakage of the fuel tank is sufficiently large to cause a rupture of the bladder as well.

It is known in flight devices of this type that the burning of fuel changes the center of gravity of the fuel tank and hence the potential direction of the flight device itself. It will be noted from the drawings and associated text in this application that the present invention, in one aspect thereof, requires a relatively high pivot point by means of which the frame is connected to the harness. This high pivot connection point can be utilized to advantage to adjust the engine and motor positions as fuel is being burned, so that changes in the center of gravity as a result of the reduction in the amount of fuel can be more easily dealt with by the pilot. As fuel burns, the device becomes lighter, changing the center of gravity, and the high pivot point facilitates control of the flight device by enabling the pilot to make small adjustments in response to the changing center of gravity. As noted and illustrated in the drawings, the pivot point and assembly allows the harness to move relative to the frame, upon which the engines and fuel tank is mounted, in both a forward and aft direction, as well as a left and right pivotal rotation. Fine control and positioning of the engines and fuel tank are therefore facilitated by the high pivot point assembly connection, as well as the nature of the connection which allows relative movement between the harness and the frame in many orientations, so that improved control of the flight device can potentially be achieved.

In a another embodiment of the invention, the flight device of the invention may comprise a single engine with a pair or double ducts. The single engine would discharge into one or two ducts, and ultimately into a pair of ducts, preferably two lateral ducts on each side of the pilot, and away from the pilot. In this bifurcated arrangement, two operational options may be possible. In a first embodiment, the entire duct, including bifurcated ducts, may move as the frame upon which it is mounted is moved by the pilot. In a further option, the ducts themselves would not move, but the ends of the ducts of each of the bifurcated ducts may move or incorporate deflectors so that the air discharge from these ducts may be controlled to determine the direction of the flight device. In yet a further embodiment, a single engine and single duct may be provided on the frame, with the single duct providing all of the necessary thrust to pilot and steer the flights device.

BRIEF DESCRIPTION OF THE DRAWINGS

In the drawings:

FIGS. 15 A, 15 B, 15 C and 15 D show various views of components of an alternative arm configuration for use on a back mounted flight machine in accordance with a further embodiment of the invention;

DETAILED DESCRIPTION OF THE INVENTION

Figure 1:
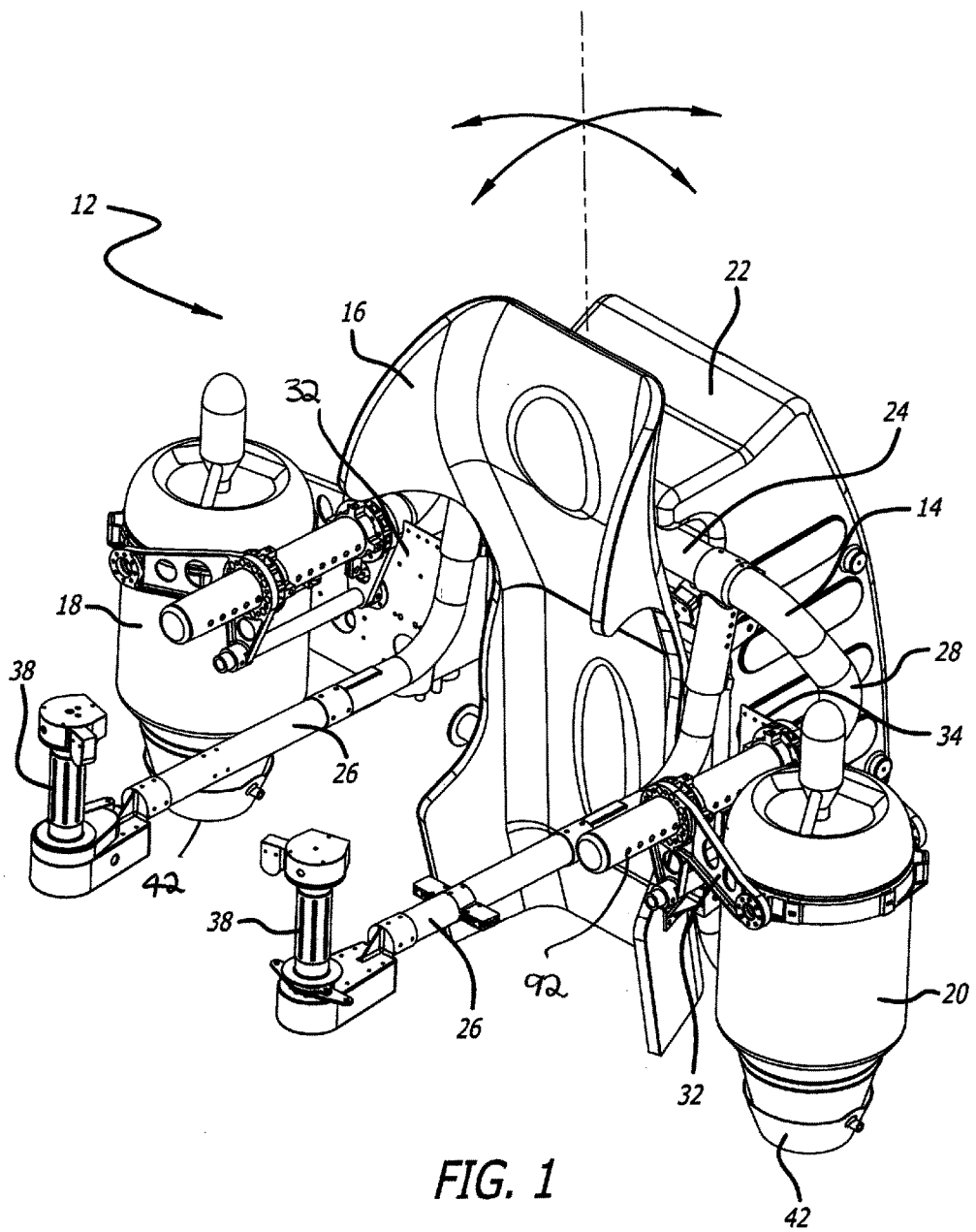
FIG. 1 is a front perspective view of a back mounted flight machine in accordance with one aspect of the invention.

Reference is now made to the drawings. The figures accompanying this application show various aspects of a jet pack or back and shoulder mounted flight machine in accordance with different embodiments of the present invention.

FIGS. 1 to 12 show one embodiment of the invention, showing a jet pack or back mounted flight machine 12. The jet pack comprises a frame 14, a harness 16 attached to the frame 14, as well as a pair of laterally placed engines 18 and 20, also attached to the frame 14. Further, a fuel tank 22 is connected to the frame 14.

The frame 14 includes a rear generally horizontal bracket 24, attached to the harness 16 as will be described, a pair of control arms 26, and a pair of engine mounting arms 28. The engine mounting arms 28 each have attached thereto one of the engines 18 or 20. As will be seen in the figures, the engines 18 and 20 are attached to the engine mounting arms 28 by a pair of brackets 32 and 34, and these brackets 32 and 34 cooperate with mounting holes on the engine mounting arms 28, so that the engines 18 and 20 can be adjusted to be slightly forward or slightly aft, as may optionally be desired based on the size and weight of a pilot, amongst other things. Furthermore, the engines 18 and 20 may be moved laterally inwardly or outwardly so as to be nearer or further away from the pilot, and this may be achieved by orienting the brackets 32 and 34 on the engine mounting arms 28, and selecting the angular positions of these brackets 32 and 34 relative to the engine mounting arms 28 so as to attain the desired position.

The control arms 26 have at the ends thereof controllers 38 which can be rotated and otherwise used to steer the flight device, as well as adjust the engine thrust and power output to permit the pilot to ascend or descend the flight device. In the embodiment shown, the controllers 38, as well as the control arms 26, allow the pilot to move the frame 14 about its pivot point assembly (to be described) so as to move or reorient the engines 18 and 20 mounted on the control arms 26 to provide the necessary directional thrust. Further, rotation or other appropriate selected maneuvering of the controllers 38 may allow, through a cable connection, the manipulation of deflectors 42 on the engines 18 and 20, to control direction, amongst other things. The controllers 38 may also provide control mechanisms for adjusting the thrust and power output of the engine to control ascent and descent of the flight device.

It will be noted that the engine mounting arms 28 have located along the length thereof a series of spaced holes or apertures 92, by means of which the brackets 32 and 34 may be connected to the engine mounting arms 28. As previously noted, the position of the engines 18 and 20 may be moved forward and aft on the mounting arms 28, effectively allowing in a relatively simple and easy to achieve manner the ability to position each of the engines 18 and 20 at a selected and optimal point along the mounting arms 28. Thus, utilizing bolts or other connecting fasteners or hardware, the bracket 34 to which the engine 20 is attached may be slid up and down the mounting arm 28, and attached at the desired point on the mounting arm by using the nearest apertures 92 to achieve the securement. The correct positioning of the engines 18 and 20 on the mounting arms 28 is of considerable importance, and the selection of the best position in a given situation may vary depending on flight conditions, the size of the pilot, the position of the pilot within the harness, and other factors. The invention thus provides a mechanism whereby the engines 18 and 20 may be appropriately positioned on the mounting arms 28 without requiring any major constructional changes to the back mounted flight machine.

Figure 3:
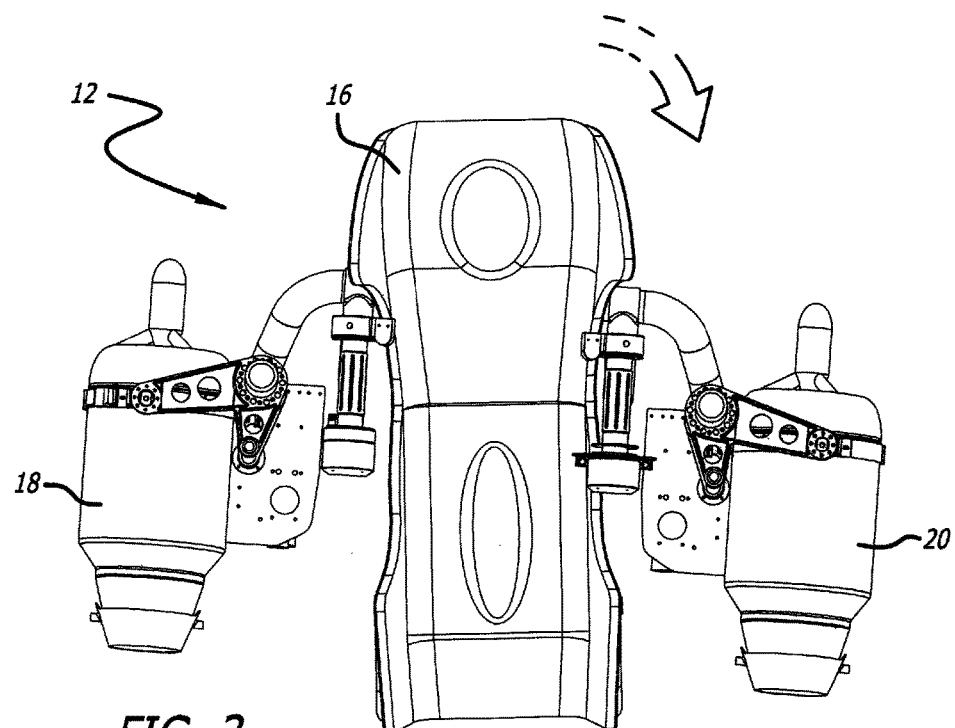
FIG. 3 is a front view as shown in FIG. 2 of the drawings, showing the frame moved in a clockwise direction.
Figure 4:
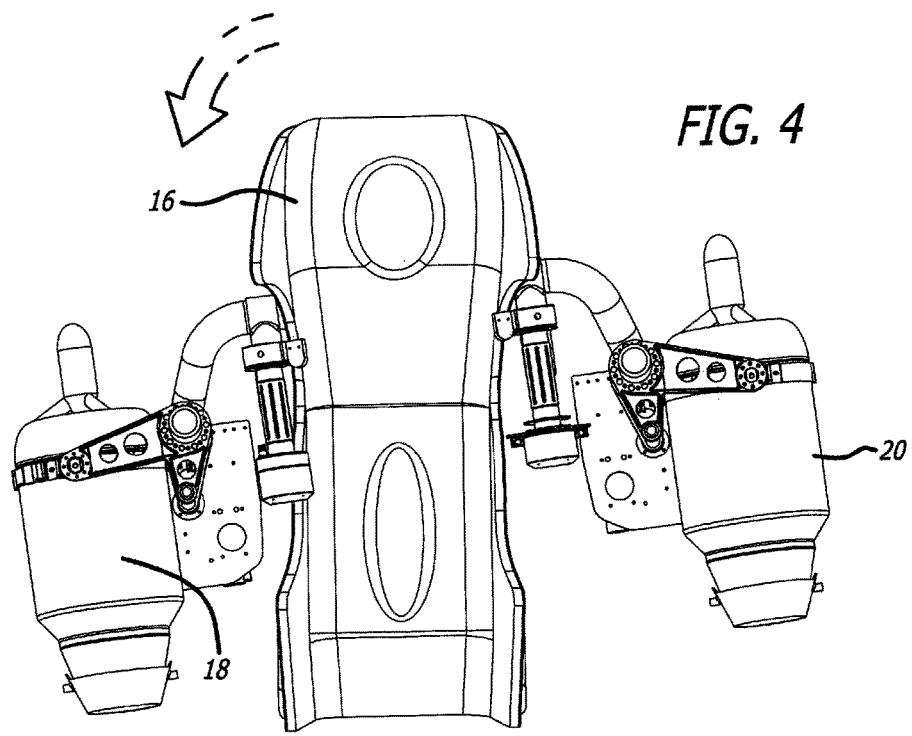
FIG. 4 is a front view as shown in FIG. 2 of the drawings, showing the frame moved in a counterclockwise direction.
Figure 6:
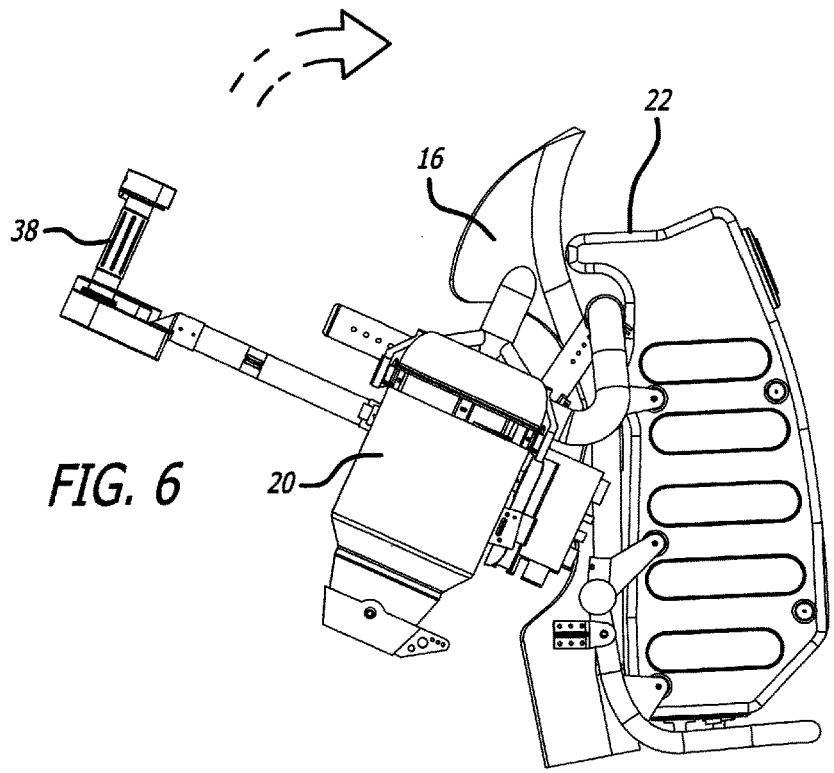
FIG. 6 is a side view similar to that in FIG. 5 of the drawings, showing the frame moved in an upward direction.
Figure 7:
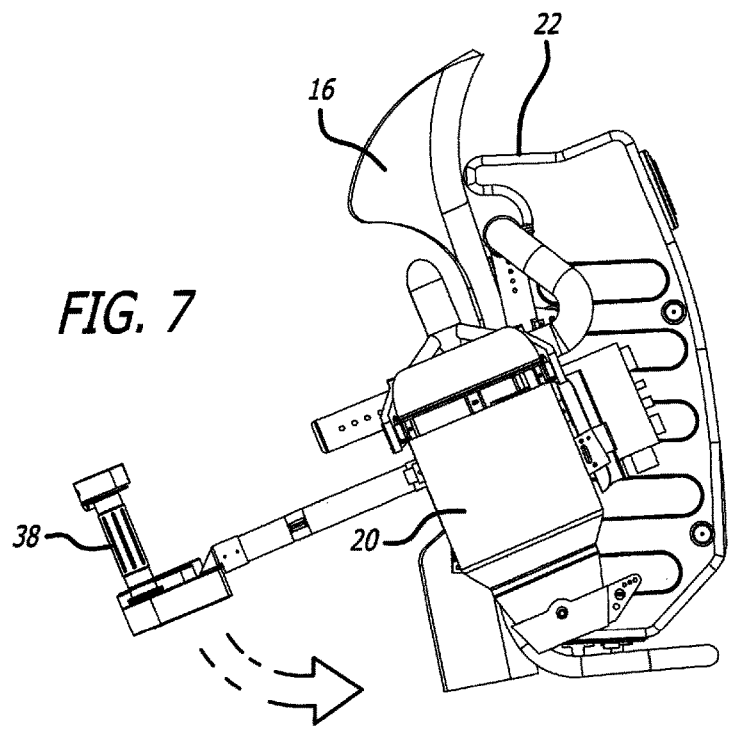
FIG. 7 is a side view similar to that in FIG. 5 of the drawings, showing the frame moved in a downward direction.

The harness 16 is connected to the frame 14 at a pivot point, shown in several of the figures, but is well illustrated in FIGS. 9, 10, 11 and 12 of the drawings. The pivot assembly 50 includes a rod 52 and a rod end 54. The rod end 54 connects to an attachment structure 56 on the back of the harness 16. The rod 52 is received by rod brackets 60 and 62 inside of the frame 14. Ball bearings are provided within the assembly 50. The pivotal connection between the harness 16 and the frame 14 allows relative movement therebetween into at least two orientations. In this regard, the frame 14 and control arms 26 can be moved up and down relative to the harness, as illustrated in FIGS. 6 and 7, and the control arms 26 can also be moved in a pivotal or rotational manner so that one arm goes up while the other down, as illustrated in FIGS. 3 and 4. The ability to move in these different orientations and axes provides the pilot with considerable control and flexibility.

Note that the pivot assembly includes internal ball bearings which allow and facilitate such pivoting or rotation within the bracket.

Figure 2:
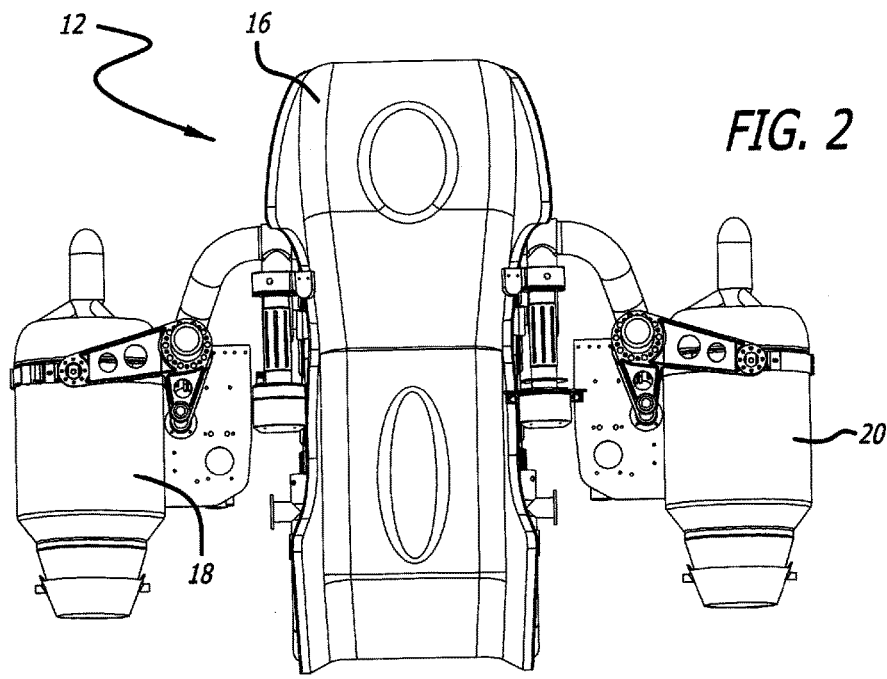
FIG. 2 is a front view of the back mounted flight machine as illustrated in FIG. 1.

FIG. 1 of the drawings shows the back mounted flight machine 12 in a front perspective view, and is illustrated generally at an at rest position. FIG. 2 of the drawings shows a front view of the back mounted flight machine 12 also at a generally rest position, with the control arms 26 both in a substantially non-tilted and generally horizontal position. FIG. 3 of the drawings illustrates the flight machine 12 wherein a slight clockwise rotation of the frame 14 relative to the harness 16 has occurred, through the operation and function of the pivot assembly 50. FIG. 4 of the drawings illustrates the flight machine 12 wherein a slight counter-clockwise rotation of the frame 14 relative to the harness 16 has occurred, once more, through the operation and function of the pivot assembly 50. These clockwise and counterclockwise rotations obviously have the effect of reorienting the position of the engines 18 and 20, at the same time changing the direction of thrust, from generally vertical to slightly angled. In this way, therefore, this movement constitutes a mechanism whereby the pilot is able to steer or move the flight machine 12 in the desired direction by adjusting the position of the control arms 26 and thus the engines 18 and 20.

Figure 5:
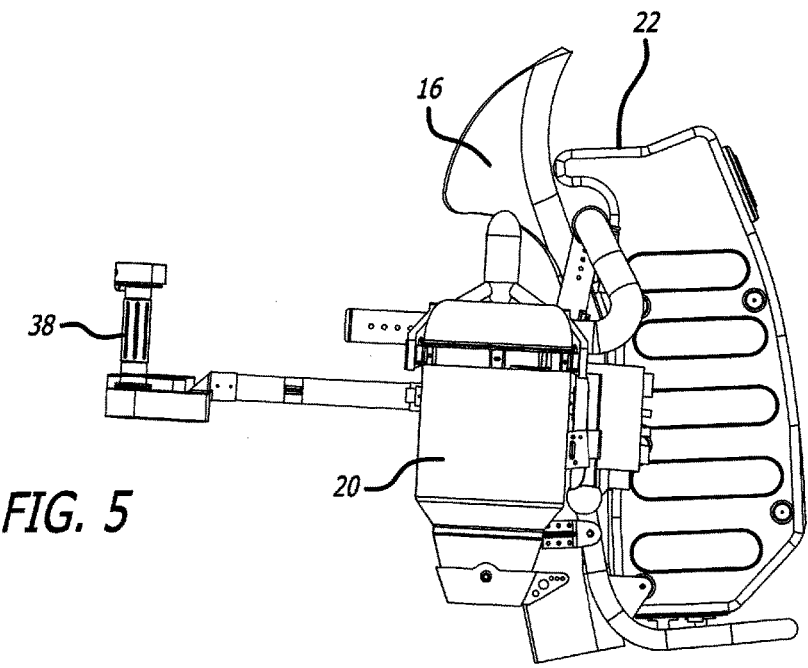
FIG. 5 is a side view of the back mounted flight machine shown in FIG. 1 of the drawings.

FIG. 5 shows a side view of the flight machine 12 in a generally at rest position. As mentioned above, relative movement between the frame 14 and the harness 16 can occur not only bilateral up and down movement, but also by forward and backward tilting. This is illustrated in FIGS. 6 and 7 of the drawings. In FIG. 6 of the drawings, the pilot's manipulation of the control arms 26 causes the frame 14 to tilt upwards relative to the harness 16, while in FIG. 7 of the drawings, a downward tilt is achieved. With reference to FIGS. 6 and 7, it will be seen that the orientation of the fuel tank 22 is generally unchanged, and that the fuel tank 22 will not go through any substantial changes in orientation or relative position during the course of the flight.

Figure 8:
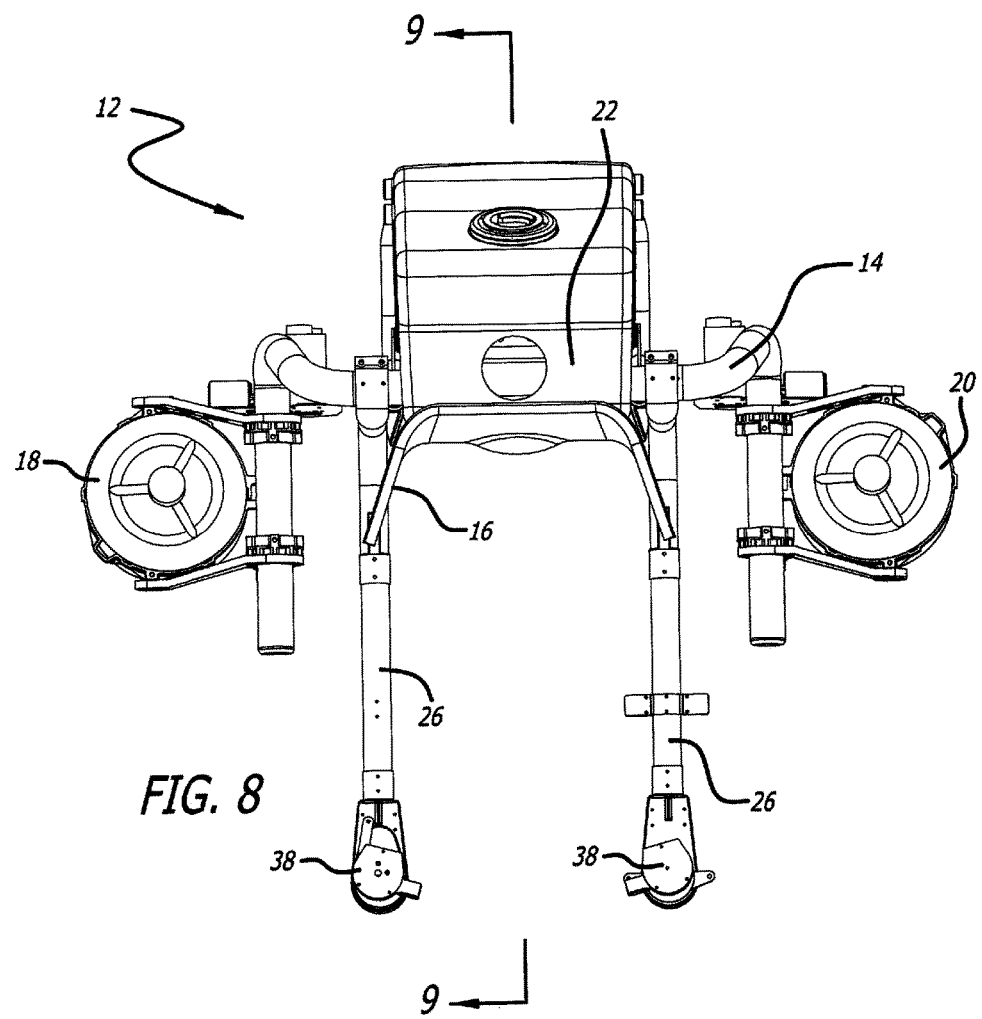
FIG. 8 is a top view of the back mounted flight machine as shown in FIG. 1 of the drawings.

FIG. 8 of the drawings shows a top view of the flight machine 12 of the invention, including the harness 16 and frame 14, and the mounting of the laterally placed engines 18 and 20 on the engine mounting arms 28 through the medium of the brackets 32 and 34. FIG. 8, as well as the previous figures, illustrate the configuration where the frame 14 includes both the control arms 26 as well as the engine mounting arms 28, so that any movement of the control arms 26 effected by the pilot will produce a concomitant movement of the engine mounting arms 28 and thus the engine 18 and 20 positions as well.

Figure 9:
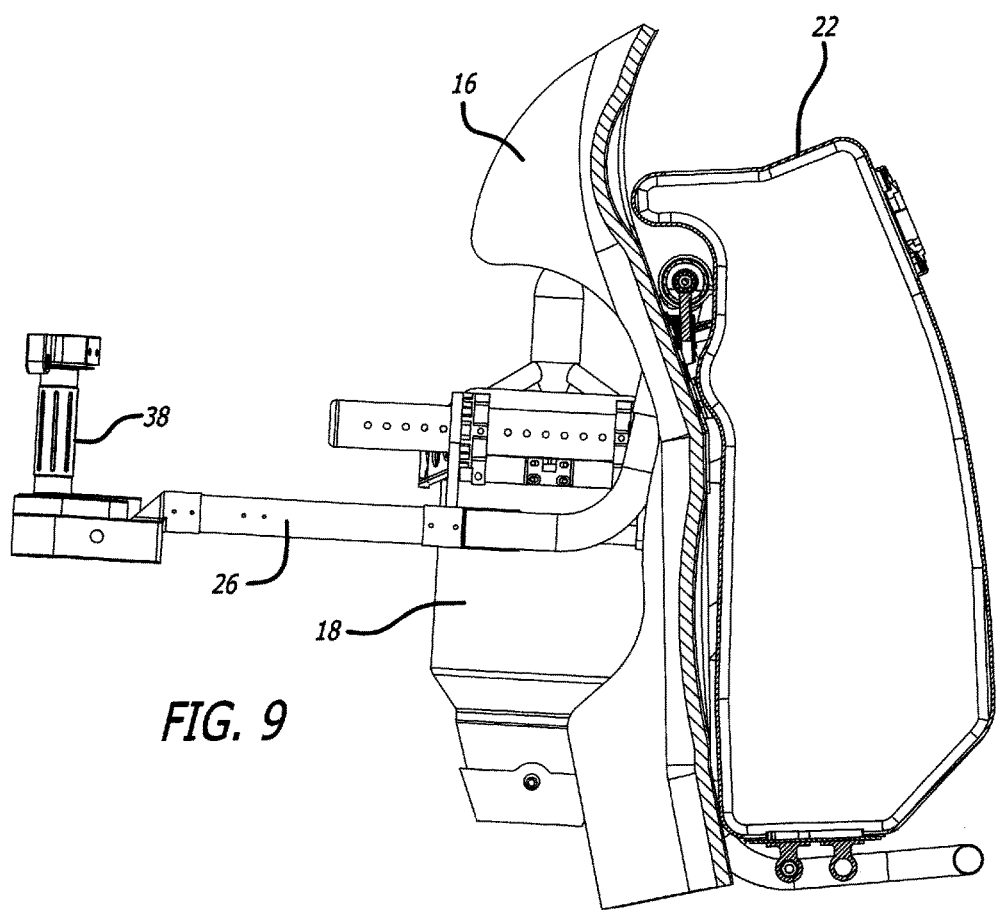
FIG. 9 is a section through the back mounted flight machine of the invention, illustrating the connection between the frame and the harness.
Figure 10:
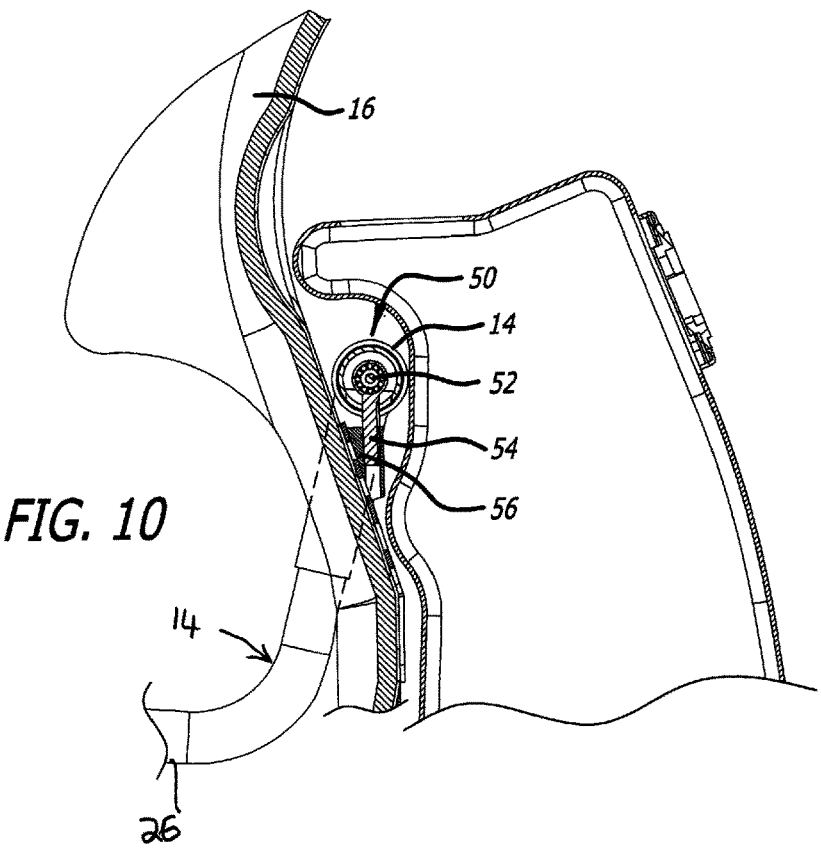
FIG. 10 is a detailed section view through the back mounted flight machine including the connection between the frame and the harness.

FIG. 9 of the drawings shows a sectional view through the flight machine 12 of the invention through line 9-9 in FIG. 8 of the drawings. FIG. 9 of the drawings shows the entire flight machine 12 in section, and helps to illustrate the position and structure of the pivot assembly 50. With reference to FIG. 10 of the drawings, there is shown a more detailed side view of the pivot assembly 50, and the mechanism by means of which it attaches the frame 14 to the harness 16. In this regard, it should be noted that the fuel tank 22 itself is fixedly connected to the back of the harness 16, and remains fixed relative to the harness 16, at lower connection points 96 and 98, as well as upper connection point 100, so that movement of the control arms 26 by the pilot will result in relative movement between the frame 14 on the one hand, and the harness 16 and fuel tank 22 on the other.

Figure 11:
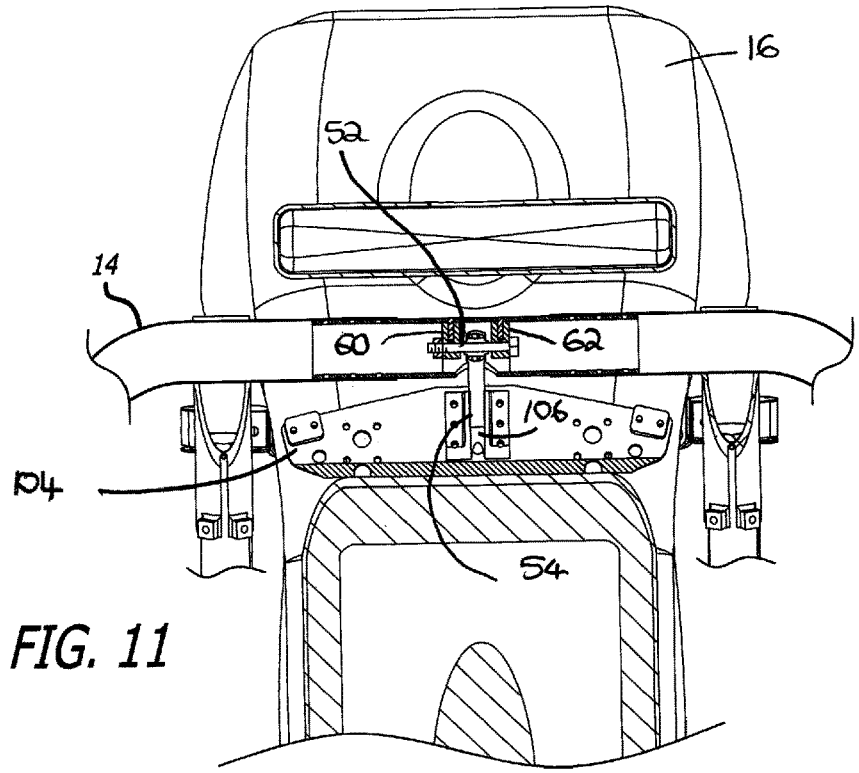
FIG. 11 is a rear view, partly in section, also illustrating the nature of the connection between the frame and the harness.

FIG. 11 of the drawings shows a rear view detail of the flight machine 12 of the invention, and particularly the frame 14 and the harness 16 connected at the pivot assembly 50. A connector plate 104 is fastened to the back of the harness 16, as part of the attachment structure 56. The connector plate 14 includes a centrally located slot 106 which receives the rod end 54, thereby establishing the connection between the rod 52 and the harness 16. Within the frame 14, which is hollow, the rod brackets 60 and 62 are located, and these rod brackets 60 and 62 receive the rod 52, thereby establishing the connection between the rod 52 and the frame 14. This pivot assembly 50, and its structure and mechanism for attachment to the frame 14 and harness 16 respectively, facilitates the clockwise and counterclockwise movement ability, as well as the for and aft tilting ability, as already described with reference to previous figures. It is to be noted that the rod 52 is received within clustered ball bearings 110 within a housing, which facilitate the smooth and sliding relative movement required, as described above.

Figure 12:
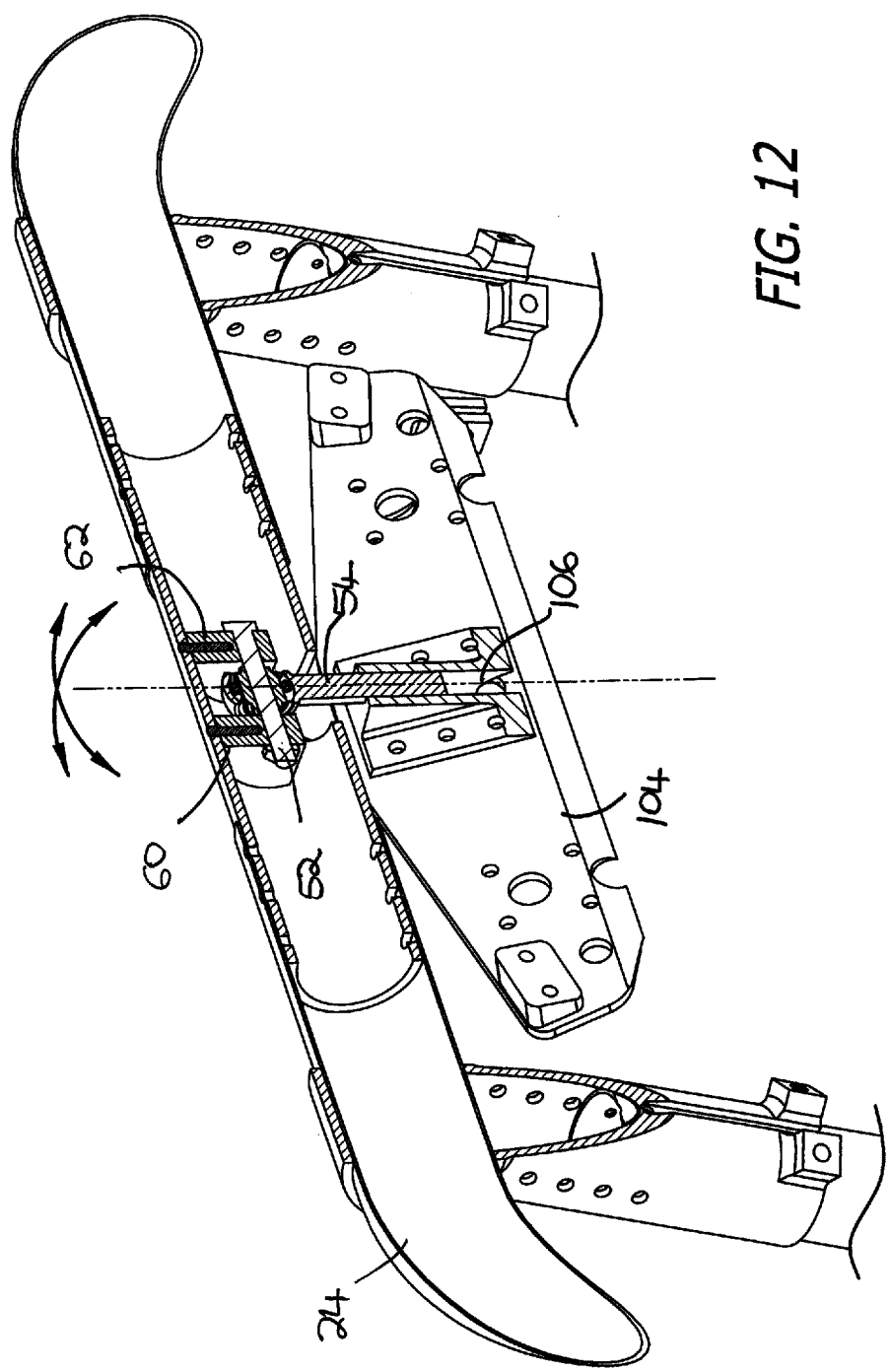
FIG. 12 is a detailed cross-sectional view through the frame illustrating in further detail the connection.

FIG. 12 of the drawings shows a detail of the frame 14 and enlarged versions of the components and hardware by means of which the frame 14 is connected to the harness 16 through the connector plate 104. It can be seen that the hollow tube comprising the frame 14 houses the rod brackets 60 and 62, which receive the rod 52, including a ball bearing cluster 110. The connection between the frame 14 and harness 16 constitutes a fastening mechanism which allows relative movement between the frame 14 and harness 16 in both the clockwise and counterclockwise directions, as well as fore and aft tilting. Further, it is to be noted that the connection between the frame 14 and harness 16 is located towards the top, and preferably center, of the harness 16, a position which allows and facilitates better control and maneuverability by the pilot of the flight machine 12.

Figure 13:
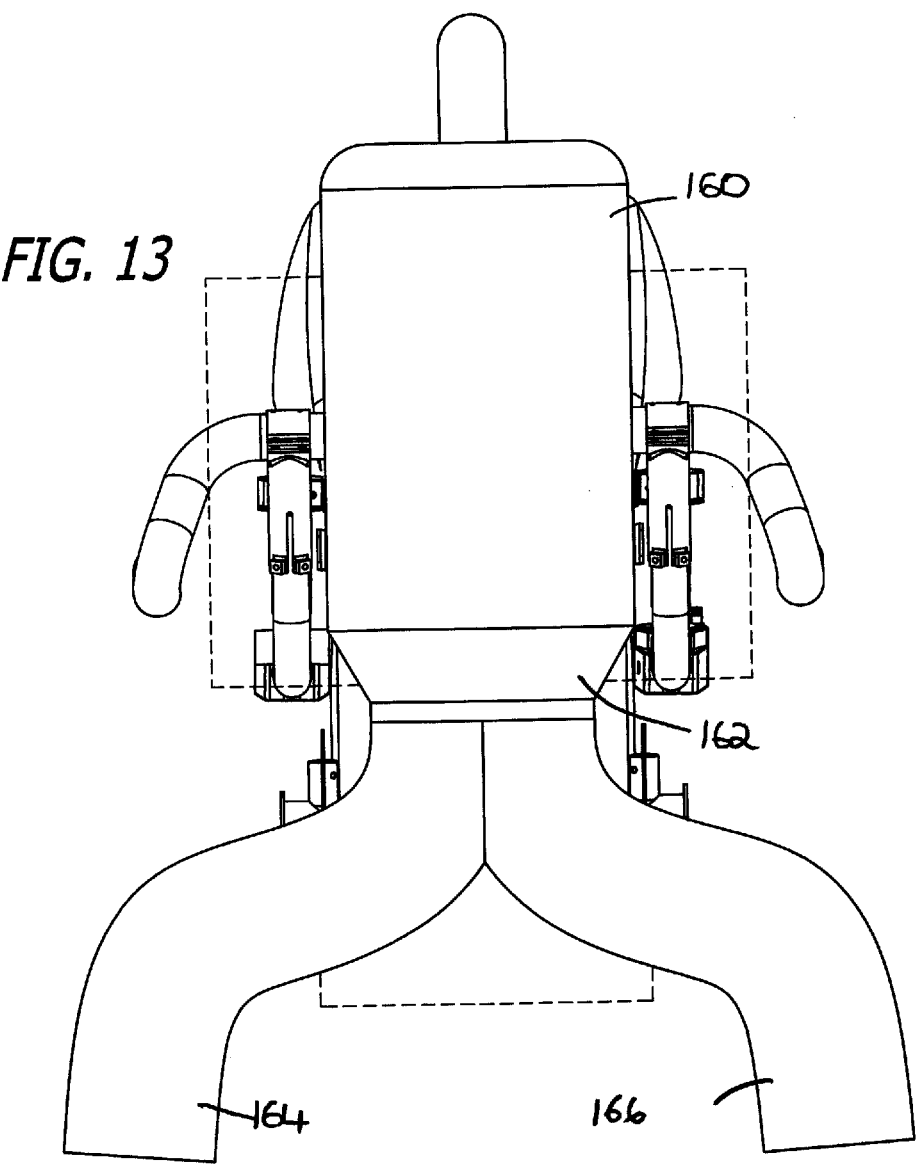
FIG. 13 is a rear view of a back mounted flight machine in accordance with a further aspect of the invention illustrating dual ducting.
Figure 14:
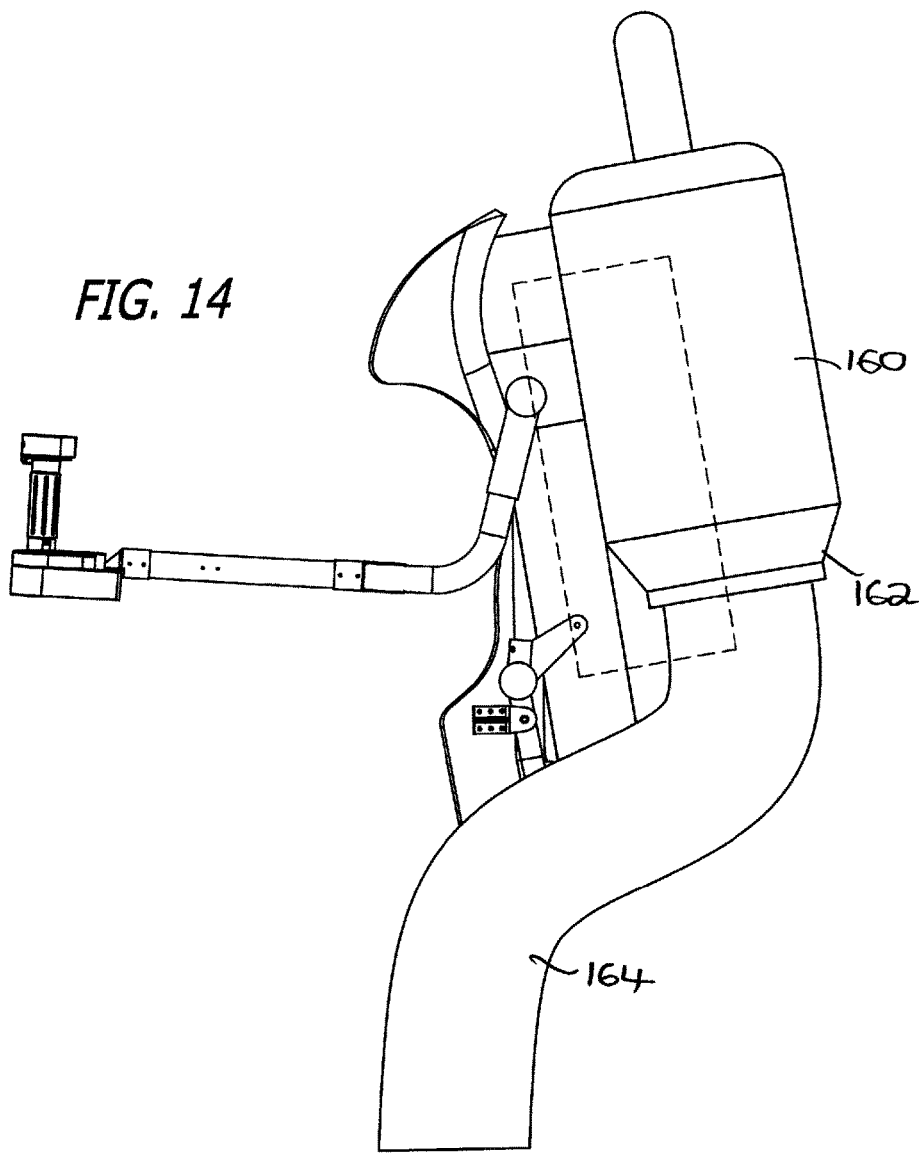
FIG. 14 is a side view of the back mounted flight machine illustrated in FIG. 14 of the drawings.

FIGS. 13 and 14 show a different embodiment of the invention, including a rear mounted single engine 160 which discharges into a duct 162. The duct 162 may then split into two lateral ducts 164 and 166 so as to be of a bifurcated configuration, as shown in FIG. 13 of the drawings, providing the necessary thrust. Alternatively, there may be a single duct outlet. FIG. 13 shows a rear view of this configuration, while FIG. 14 shows a side view thereof.

FIGS. 15 to 18 show the structure of an alternative embodiment of the frame, in which the engines 18 and 20 are mounted from brackets connected to the control arms. In this configuration, in contrast to the embodiment shown in FIG. 1 and other figures, there is no separate mounting arm 28, and the control arm 26 also serves as the component by means of which the lateral engines are connected to the flight machine 12. Therefore, in this embodiment, the frame 14 may be of a slightly simpler design, melding the control arms 26 and engine mounting arms 28 into a single component. It is to be noted that the same ability to fine tune the position of the engines 18 and 20, as described in previous embodiments, remains, and by utilizing the control arm as a mounting surface in combination with flexible designed brackets and multiple point mounting areas, an optimal position for the engines can be established based on the specific parameters which may be taken into account for the engine mounting.

There is provided an L-shaped bracket connected at one point to the control arm, and at another point to the engine. This bracket may be moved forward and aft along the control arm, and secured in a position best suited to the weight and size of the pilot.

FIG. 15A of the drawings shows a side view of a main bracket or control arm, while FIG. 15B is a front view thereof, and FIG. 15C a top view. FIG. 15D is a cutaway or section front view showing some of the constructional features of the main bracket.

Figure 16C:
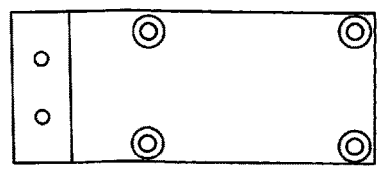
FIGS. 16A, 16B, 16C, 16D and 16E show various views of additional components for use in an alternative arm configuration for use on a back mounted flight machine in accordance with the present invention.
Figure 16D:
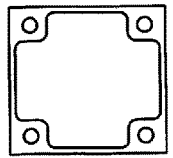
Figure 16A:
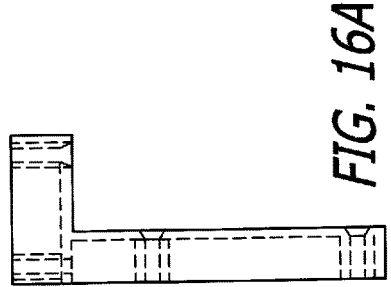
Figure 16E:
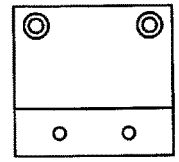
Figure 16B:
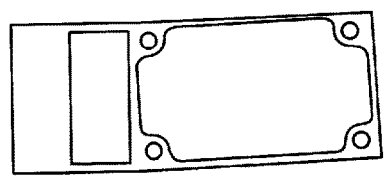

FIG. 16A is a top view of the engine grip arm, or bracket, which is an intermediate of fee fastening component between the control arm or main bracket and the engine. FIG. 16B is a front view of the grip arm, FIG. 16C is a rear view of the grip arm, FIG. 16D is a top view of the grip arm, and FIG. 16E is a side view of the grip arm.

Figure 17C:
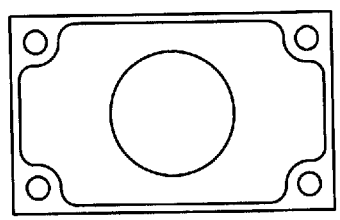
FIGS. 17A, 17B, 17C and 17D show schematic representations of components in an alternative arm configuration for use on a back mounted flight machine in accordance with the present invention.
Figure 17B:
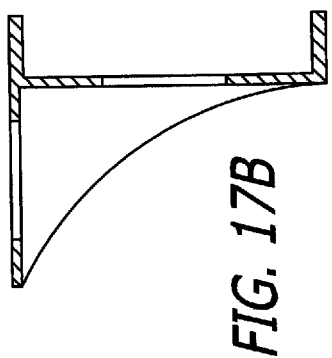
Figure 17D:
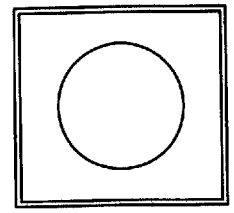
Figure 17A:
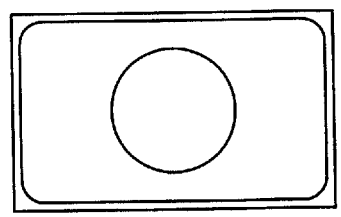

FIG. 17A is a view of the engine grip, FIG. 17B is a top view thereof, and FIG. 17D is a side view thereof.

Figure 18C:
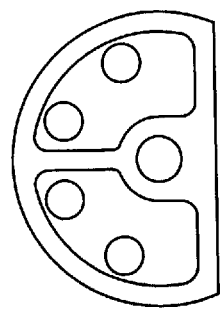
FIGS. 18A, 18B and 18C illustrate schematically a pivot mount structure in accordance with one aspect of the present invention.
Figure 18B:
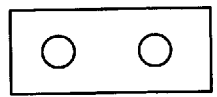
Figure 18A:
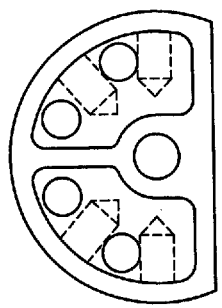

FIGS. 18A, 18B and 18C show a detail of the pivot assembly, such as that seen in FIG. 12, in accordance with one embodiment of the invention, as described generally in previous figures. FIG. 18B illustrates the bottom view, while FIG. 18C illustrates the side view.

Figure 19:
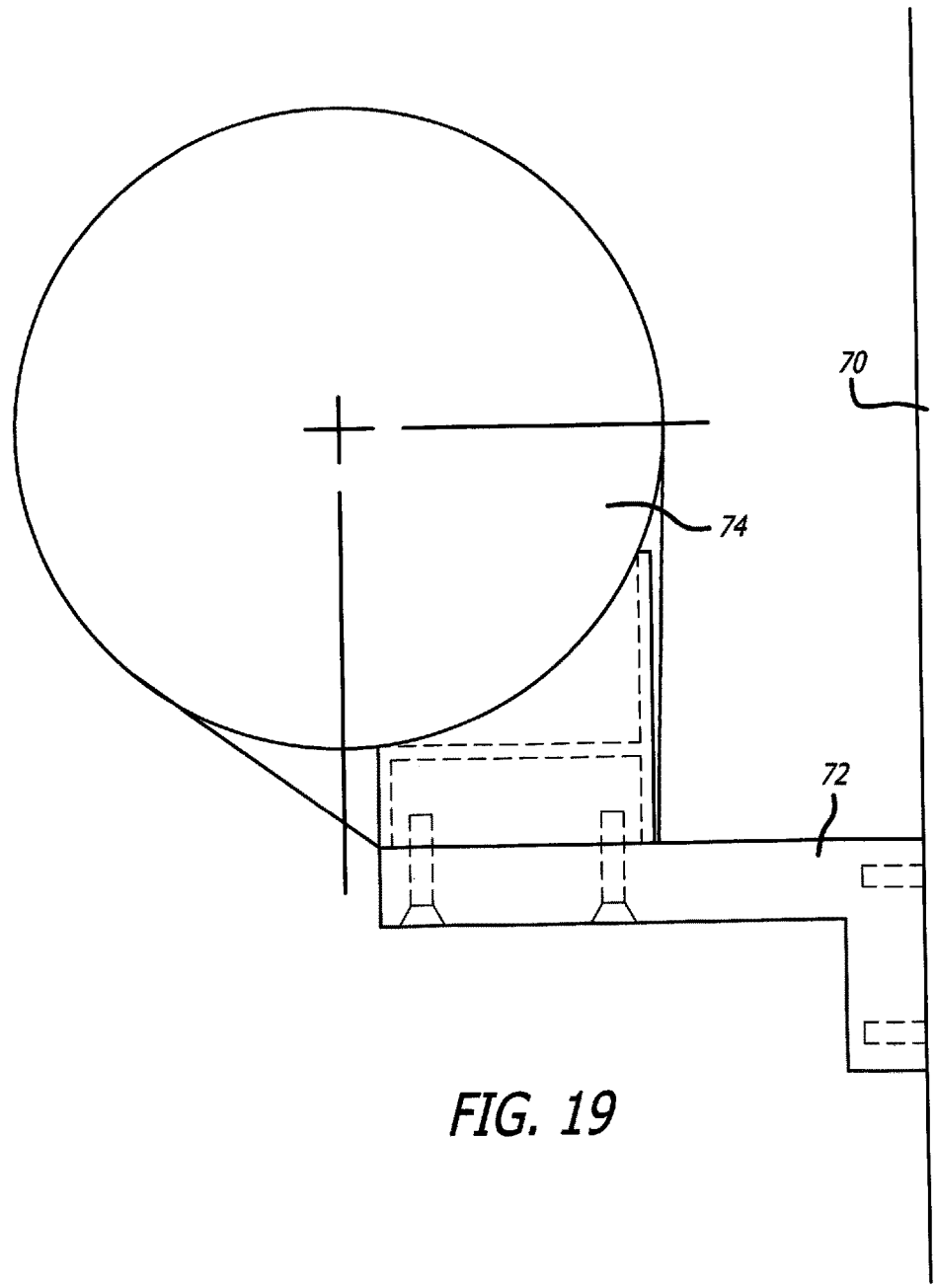
FIG. 19 illustrates an alternative structure for mounting an engine in a back mounted flight machine in accordance with one aspect of the invention.
Figure 20A:
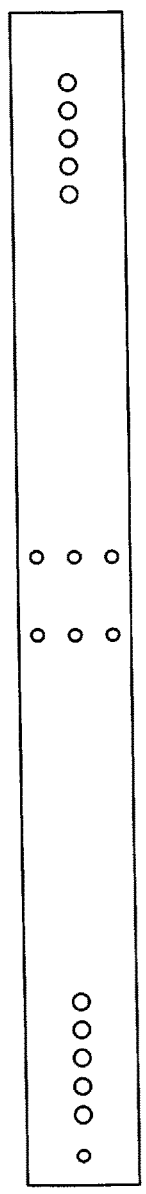
FIGS. 20A, 20B, 20C and 20D show additional structures in an alternative embodiment of the back mounted flight machine in accordance with a further aspect of the invention.
Figure 20B:
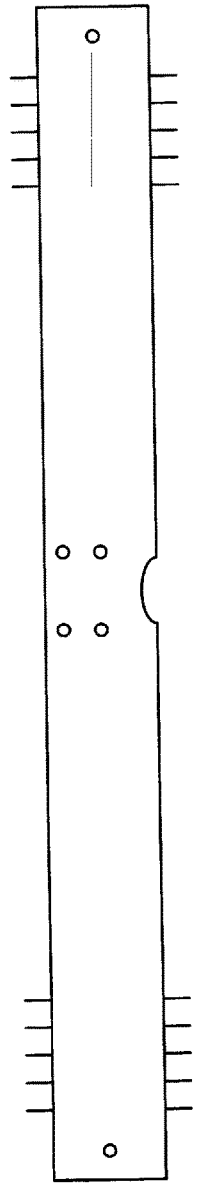
Figure 20C:
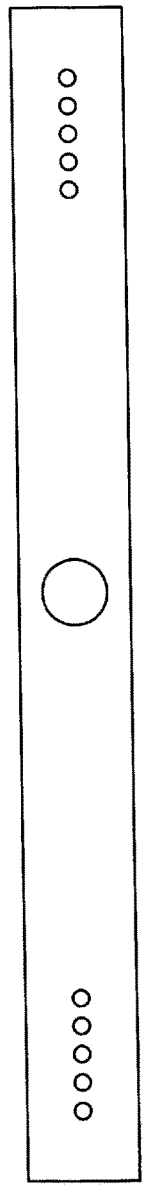
Figure 20D:
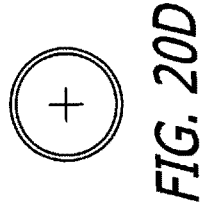

FIG. 19 of the drawings shows a top view, left side, of an engine mount of the invention. In this embodiment, as mentioned above, the engine is mounted by means of a bracket directly to the component which is also the control arm. A part of the control arm 70 is shown in this figure, and the L-shaped bracket 72 (seen in FIGS. 16A and 21) is attached thereto. An engine 74 is attached to the L-shaped bracket 72. The engine 74 can be moved fore and aft by repositioning the L-shaped bracket on the control arm 70. In this regard, it will be seen that the control arm 70, illustrated and described in previous figures, has a multiplicity of fastening or connection points for the engine bracket, so that the flight machine 12 of the invention in accordance with this embodiment still allows optimal and fine tuned multi-positioning of the engine 74 based on external parameters, including, for example, the size and positioning of the pilot, amongst other things. It is to be noted that the engine 74 can be moved backward and forward along the control arm 70 by adjusting the connection point of the bracket 72 on the control arm 70. Additionally, by means of the connection of the engine 74 to the bracket 72, the engine 74 can be adjusted so as to be nearer to, or further away from, the control arm 70. As such, a significant range of potential locations and orientations of the engine 74 relative to the control arm 70 can thus be achieved.

Figure 21:
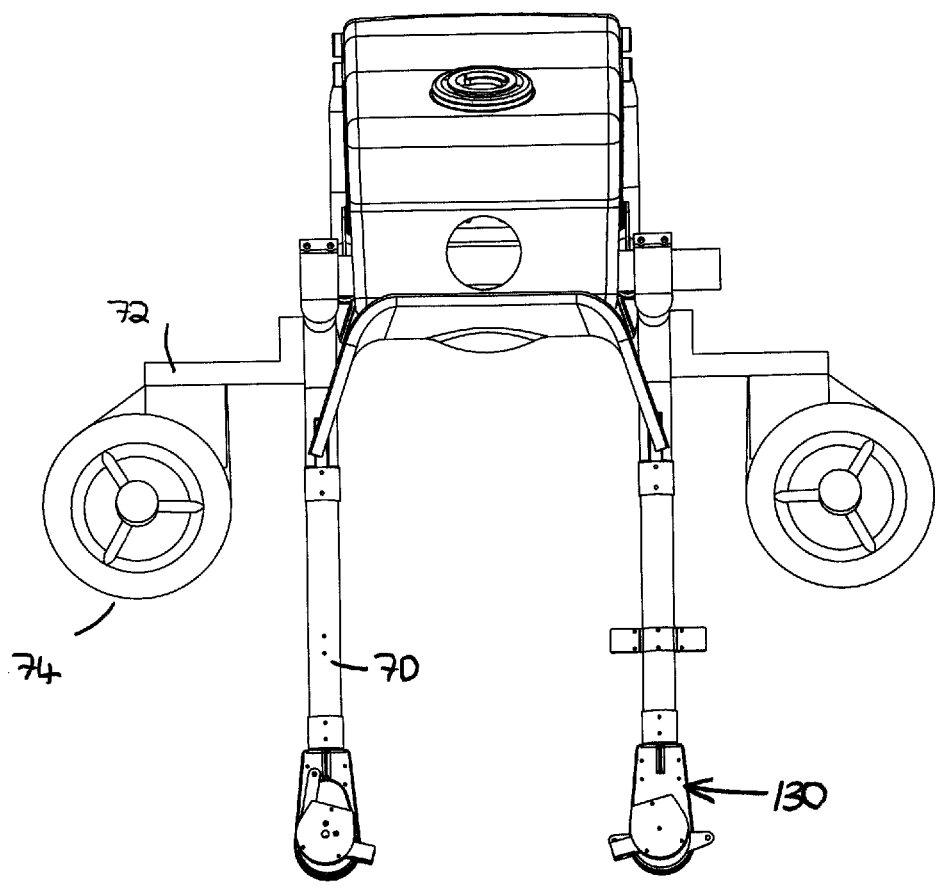
FIG. 21 is a top view of a back mounted flight machine in accordance with one aspect of the invention showing the mounting of the engines and control mechanisms mounted at the end of the arms.

FIGS. 20A, 20B, 20C and 20D show different views of components of the control arm illustrated in FIG. 21 of the drawings.

FIG. 21 shows a top view of a flight machine in accordance with an embodiment of the invention wherein the control arm 70 also serves as the connector component for the engine 74, through the medium of the bracket 72. In this figure, the engine 74 has been mounted so as to be near its rear limit position, with the bracket 72 being connected at or near the back of the control arm 70. Further, the engine 74 is mounted so that it is nearing the maximum distance or spacing from the control arm 70, the engine 74 being positioned at or near the outermost location of the bracket 72. It will, of course, be appreciated that the bracket 72 may be moved forward on the control arm 70, and the engine 74 moved inward towards the control arm 70, in multiple increment settings so that the optimal position of the engine 74 can be established.

FIG. 21 is the top view of a back mounted flight machine in accordance with the invention. As noted, the frame arms form the basis for connection of an L-shaped bracket by means of which the engines may be fastened to the device. The L-shaped bracket may be moved both forward and back. Another important option for adjustment in this embodiment is that the engine 74 may be moved up and down relative to the bracket 72, so that fine positioning of the engine in its vertical orientation can be secured for optimal effect, based on the weight and weight distribution of the pilot amongst other parameters. This figure also shows some of the hand controls 130 at the end of the arms 70, where the hands of the pilot would normally be located, and which allow the output, direction and other attributes of the flight machine to be controlled and manipulated. In use, at least the forearms of the pilot would rest on the control arm 70, so that the hands are comfortably located around the hand controls 130. In this position, the pilot would be able to control the flight by manipulating the hand controls to determine engine power output, thrust, and other factors, and also move the frame relative to the harness in the up and down directions, as well as the clockwise and counterclockwise rotations. In this manner, the pilot therefore maintains full, effective and efficient control over the flight machine.

Figure 22:
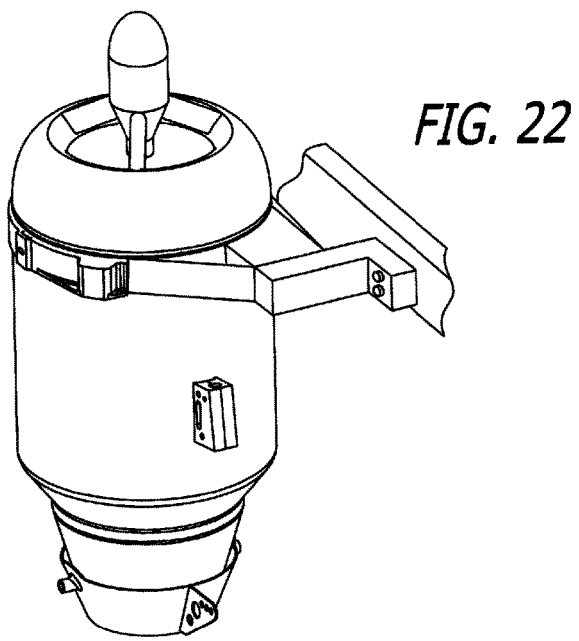
FIG. 22 is a perspective view of an engine mounted on a frame, including deflectors, of a back mounted flight machine of the invention.

FIG. 22 is a detailed view showing a connection of the engine to a bracket, and a detail of the fastening of the bracket to the arm mechanism. Details of these components can be seen in FIG. 17B and FIG. 16A.

Figure 23:
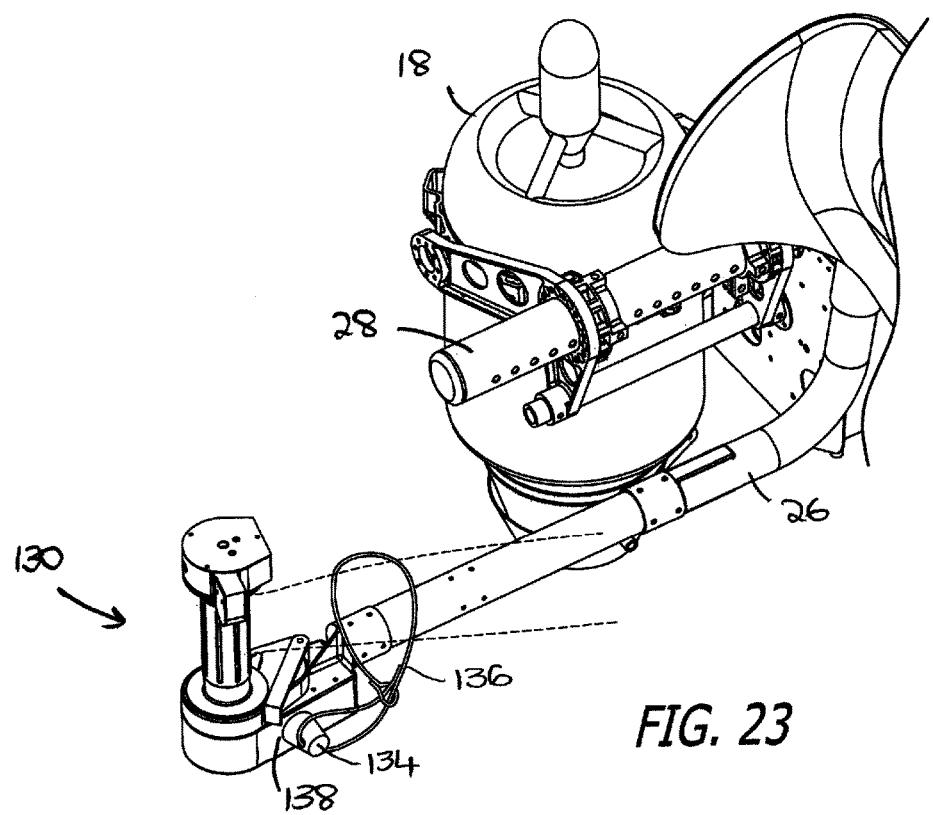
FIG. 23 is a detailed view of a back mounted flight machine in accordance with one aspect of the invention, including details relating to the hand controls and a safety switch connectable to the hand of the pilot.

FIG. 23 of the drawings shows a further detail the embodiment of the invention including an control arms 26 with hand controls 130 at the end thereof for use by the pilot, and a further separate mounting arm 28 upon which the engine 18 is mounted. The separate arm configuration, in accordance with one embodiment of the invention, additionally allows for the fine positioning of the engine relative to the remainder of the frame, so that the balance, weight distribution and other factors can be taken into account when positioning the engine on the flight device for optimal effect and operation of the flights device.

Figure 24:
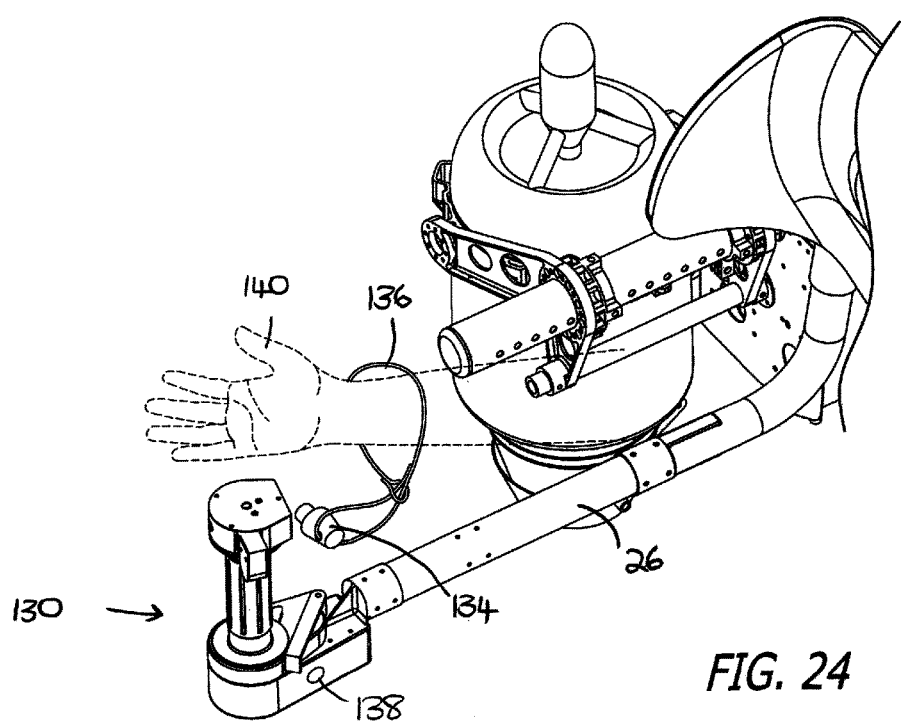
FIG. 24 is a similar view to that shown in FIG. 23, illustrating the situation where the hand and arm of the pilot disconnects the safety switch.

Note that FIG. 23 also shows a safety or emergency switch 134, which includes a tie or mechanism 136 by means of which it can be connected to the pilot, such as to the pilot's wrist. This safety or emergency switch 134 will be pulled out from its socket 138, at certain appropriate times, which may be programmed to have different effects as desired. This safety switch 134, when activated, may result in the shutdown of the engines, reduction in the power output, deployment of an emergency device such as a parachute, or such other consequence as may be selected and desired by the user and built into or programmed into the device. As shown in FIG. 24 of the drawings, this figure illustrates in phantom lines the hand 140 and arm of the pilot, and how the cord 136 around the wrist of the pilot causes the safety or emergency switch 134 to disengage from the socket 138 in which it is located when the pilot's arm is more than a predetermined distance from the arm of the frame 18, and is pulled out as a result thereof.

Figure 25:
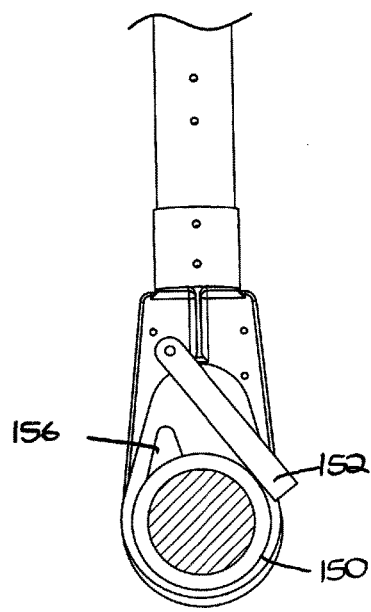
FIGS. 25, 26 and 27 show sequential operation of a and control mechanism for controlling the engine for a back mounted flight machine in accordance with one aspect of the invention.
Figure 26:
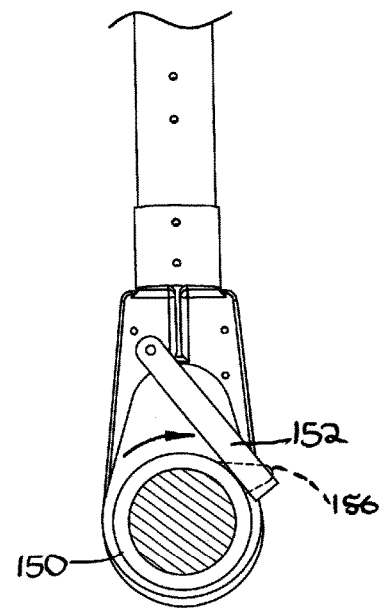
Figure 27:
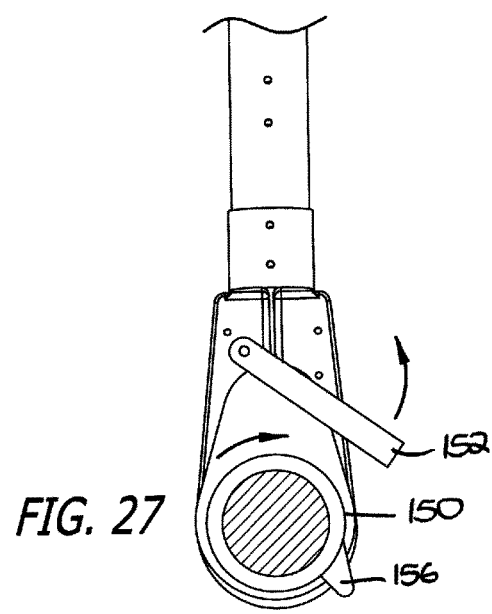

FIGS. 25, 26 and 27 of the drawings show some of the fine controls which may be part of the flight device in accordance with the invention. Typically, the pilot may determine the amount of thrust or power output of the engine by rotating a handle 150 which is held by the pilot's hand. In one form of the invention, the amount of power or thrust increases at a greater rate during the early stages of rotation of the handle 150, and at a lesser rate once the flight machine has become airborne. Therefore, movement of the handle 150 in certain increments may not at selected times result in such significant thrust changes, giving the pilot better fine control in flight. These figures the show a spring-loaded arm 152 in association with the rotatable handle 150, which together can be adjusted and fine tuned so as to provide appropriate changes in thrust and power output at the relevant time. At different points along the angular rotation, a different amount of increase or decrease in thrust may be applied to the engine over a given increment or decrement depending upon the angular position of the handle 150. The handle 150 includes a projection or tab 156 along a section of its circumference, which engages and moves the spring-loaded arm 152 at selected points. FIGS. 25 to 27 show sequential positions of the handle 150, and the interaction thereof by means of the tab 156 with the spring-loaded arm 152 as the handle is rotated through its positions by the pilot.

Figure 28:
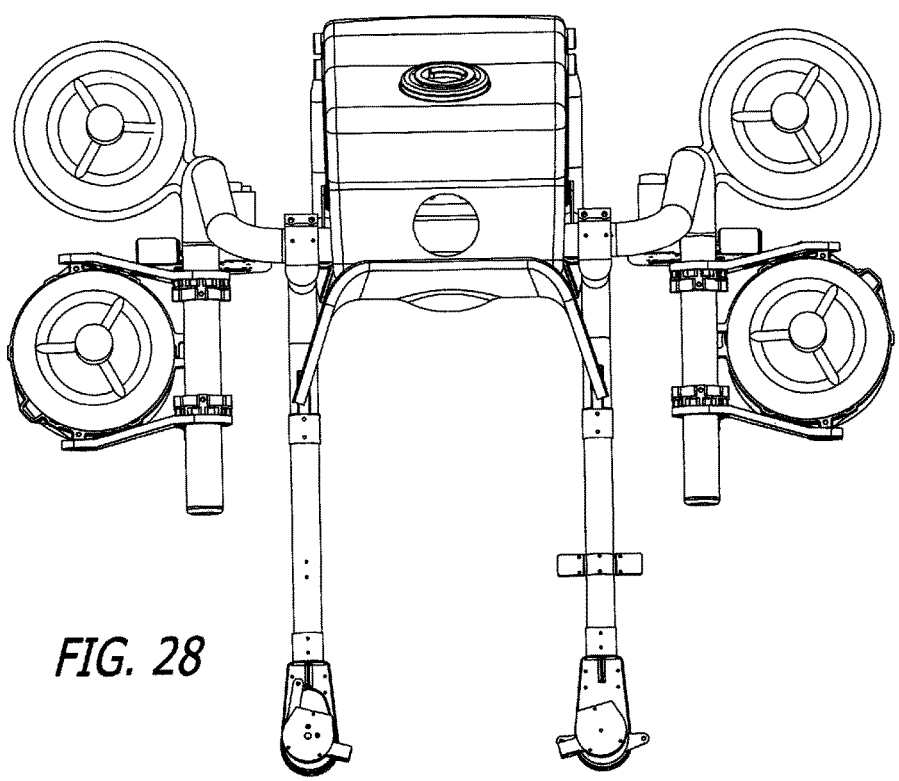
FIG. 28 is a top view of a back mounted flight machine in accordance with a further aspect of the invention with two engines mounted on each side thereof.

FIG. 28 of the drawings shows a top view of a flight device in accordance with a further aspect of the invention, in this case including four engines, two on each side of the frame, fore and aft of each other. These engines may be mounted on a separate engine mounting arm, which is part of the frame, but separate from the arm for the pilot, and the controls at the end thereof. Engines may be individually positioned for optimal effect, as described above. Note that this embodiment including the four engines may also be used on the single control arm embodiment described above, with both engines on each side mounted to the control arm directly by means of one or more brackets.

Figure 29:
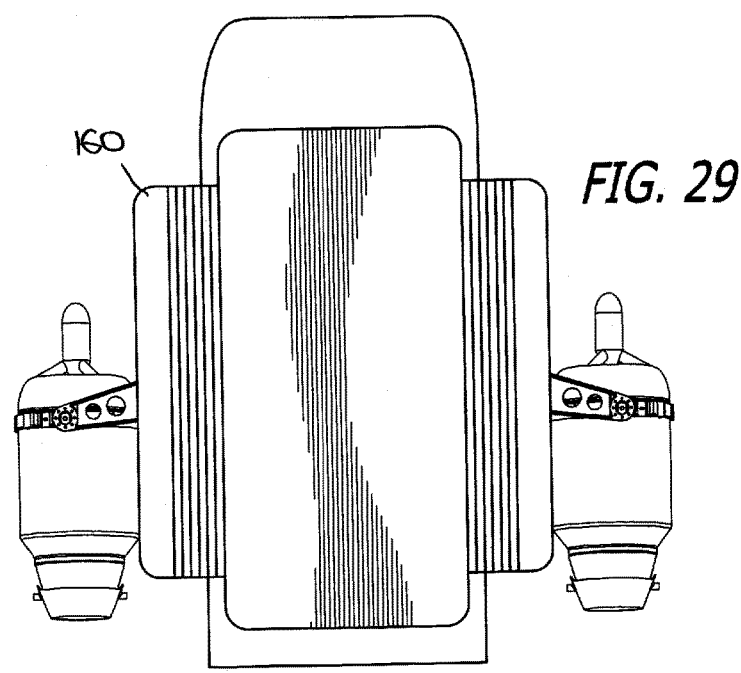
FIGS. 29 and 30 illustrate a back mounted flight machine in accordance with a further aspect of the invention including a retractable protective barriers which can be deployed between the pilot and the engines.
Figure 30:
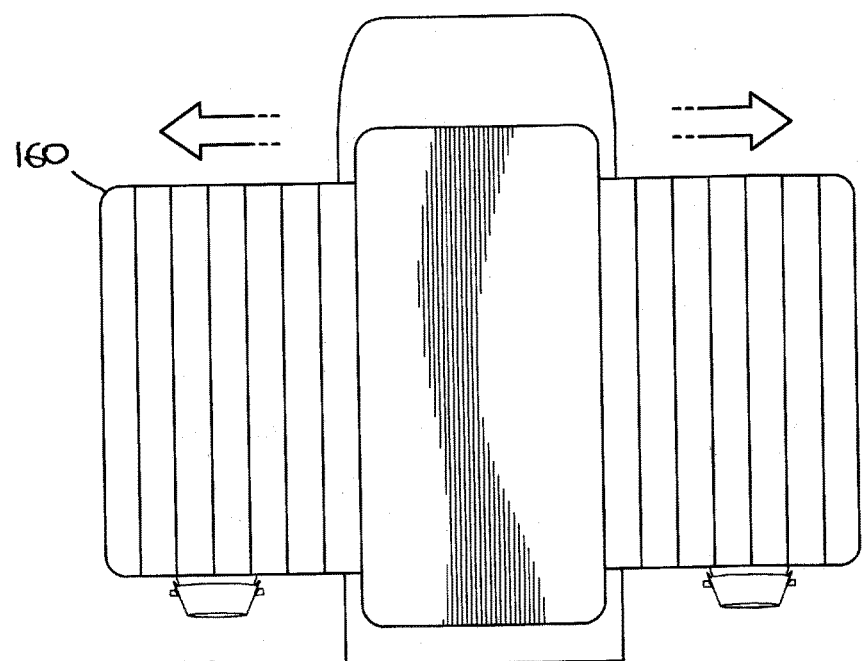

FIGS. 29 and 30 show a further aspect of the invention, and these figures show a view of the flight device with a retractable panel 160 movable between a first position in which the panel is retracted, as shown in FIG. 29 of the drawings, and a second position in which the panel is extended, as shown in FIG. 30 of the drawings. The embodiment shows a retractable panel 160 on each side of the device. The retractable panel 160 may operate as a heat barrier between the engine and the pilot. In many instances, the engines may give off intense heat, particularly so during takeoff, and the presence of the retractable panel 160 may be particularly useful to protect the pilot during takeoff and landing, when a pilot may be more likely to experience the effect of the substantial heat produced by the engines.

Figure 31:
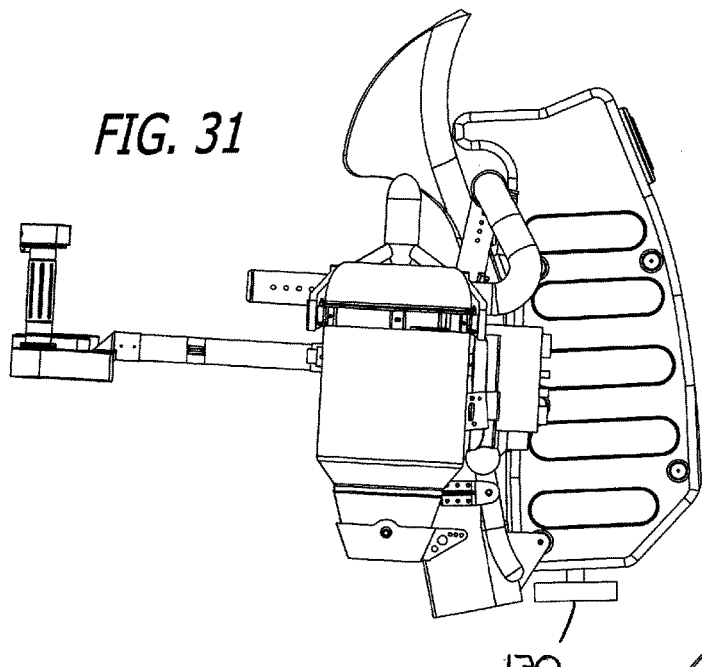
FIGS. 31 and 32 illustrate a back mounted flight machine in accordance with yet a further aspect of the invention including a retractable landing gear which can be deployed to support the machine on land.
Figure 32:
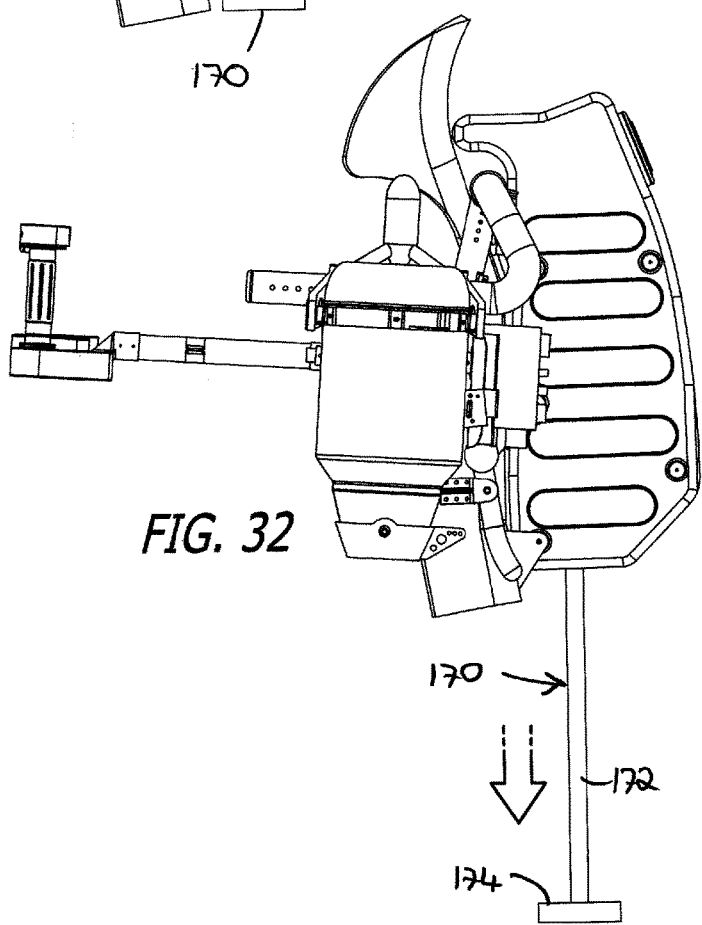

FIGS. 31 and 32 show yet a further embodiment of the invention, including the presence of a retractable support 170, which is shown in the retracted position in FIG. 31, and in the extended position in FIG. 32. The retractable support 170 comprises an arm 172 and a foot 174. This retractable support 170 may, in the extended position, provide more stability and support so that the flight device can be more conveniently fitted to and removed from the pilot before and after a flight respectively. Further, the extent to which the retractable support 170 extends outward can be adjusted so as to take into account the specific types of the pilot, including height and other dimensions.

Figure 33:
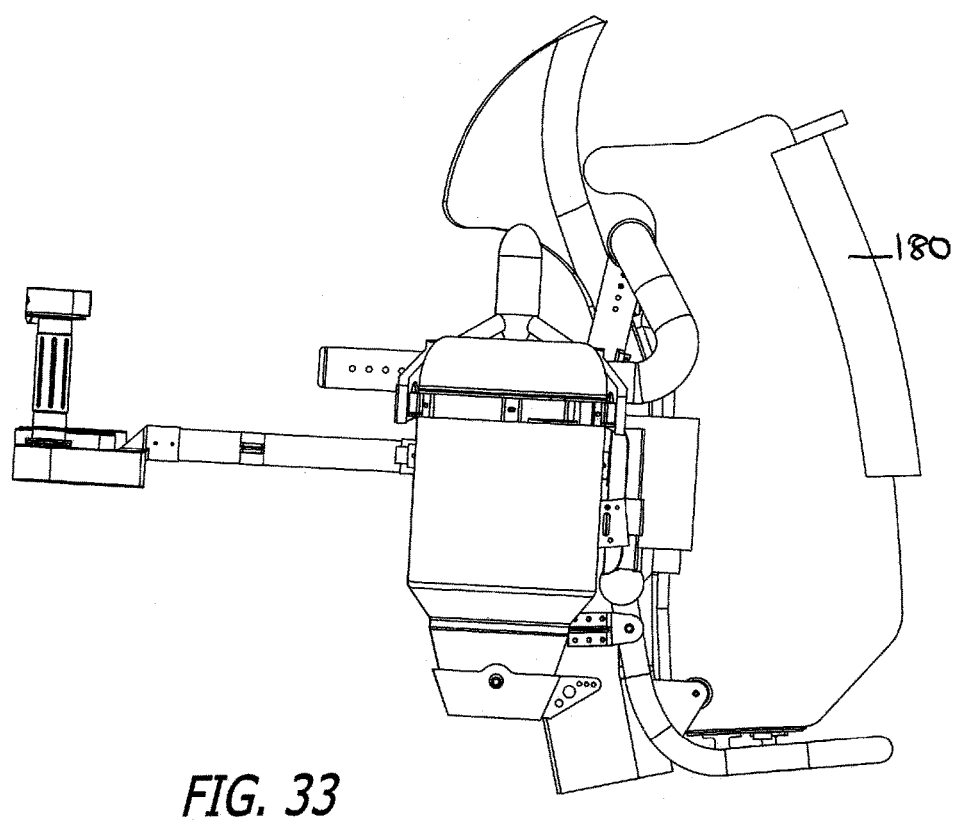
FIGS. 33 and 34 illustrate a back mounted flight machine in accordance with still a further aspect of the invention including the presence and deployment of a parachute for possible use in both emergency and non-emergency situations.
Figure 34:
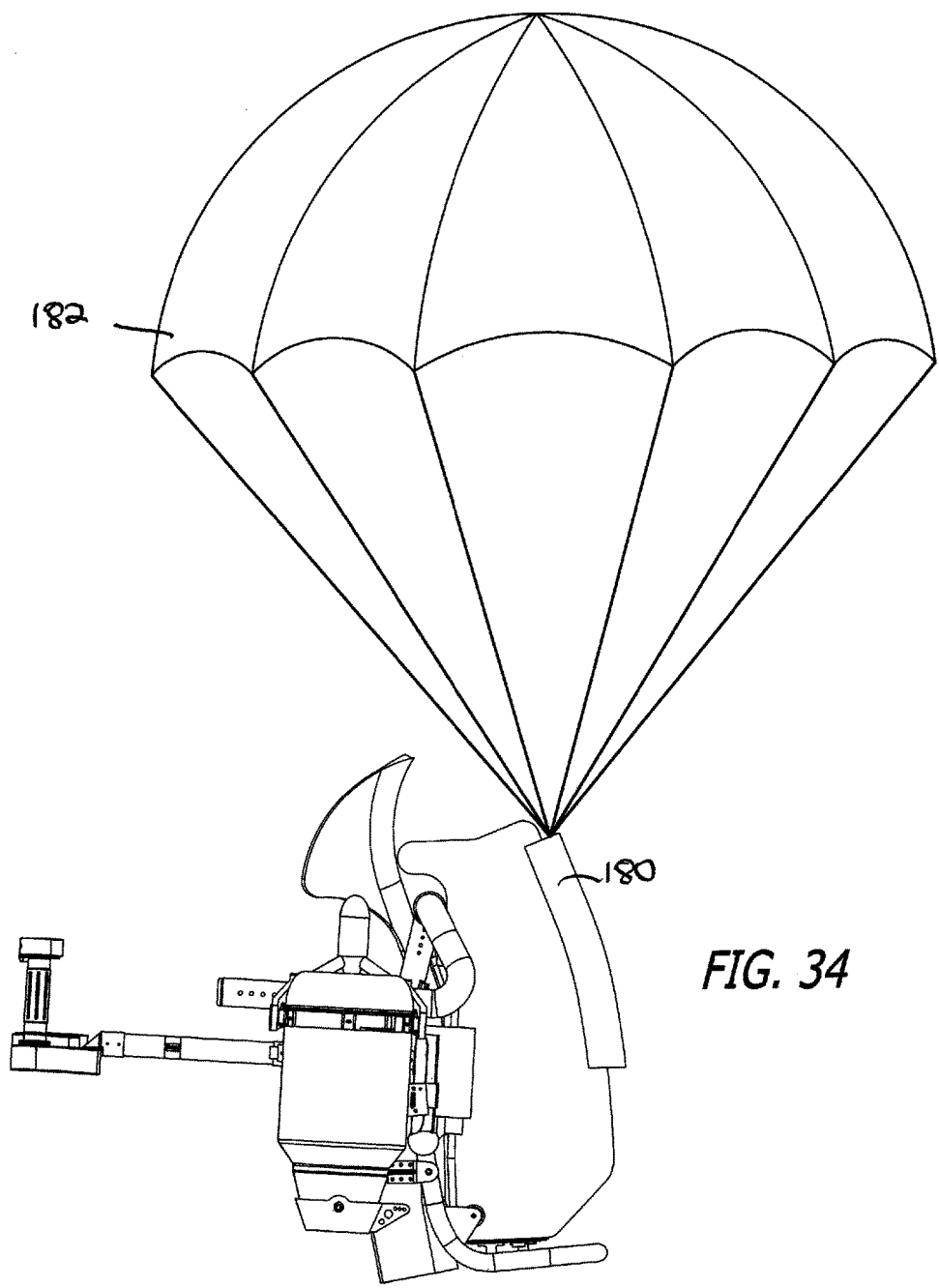

FIGS. 33 and 34 of the drawings shows a further embodiment of a flight device in accordance with the invention, and which includes a compartment 180 for a deployable parachute 182. FIG. 33 shows a compartment fitted on the back of the fuel tank, and which houses the parachute 182 when in it stored position. FIG. 34 shows the parachute 182 when it has been deployed. The parachute 182 can be deployed at the choosing of the pilot, depending upon the circumstances, and may be used during certain emergency events such as engine failure to ensure a soft landing, or it may be used even without engine failure but when circumstances are such that a slowing of the vehicle may become necessary for a safe landing.

Figure 35:
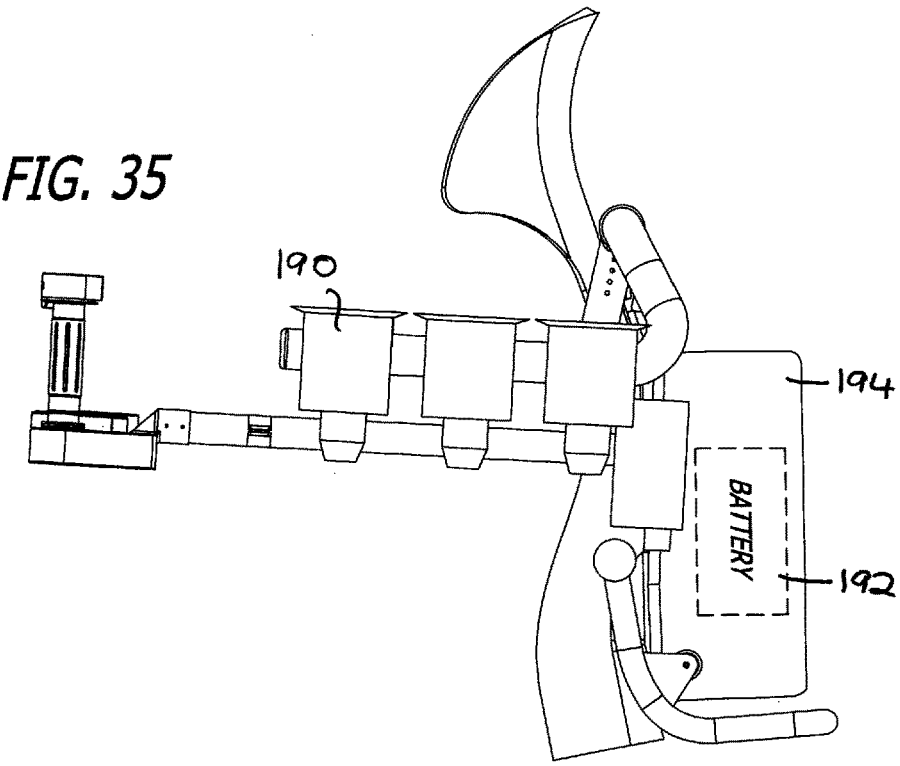
FIG. 35 is a side view of a back mounted flight machine in accordance with a further aspect of the invention including a battery pack.
Figure 36:
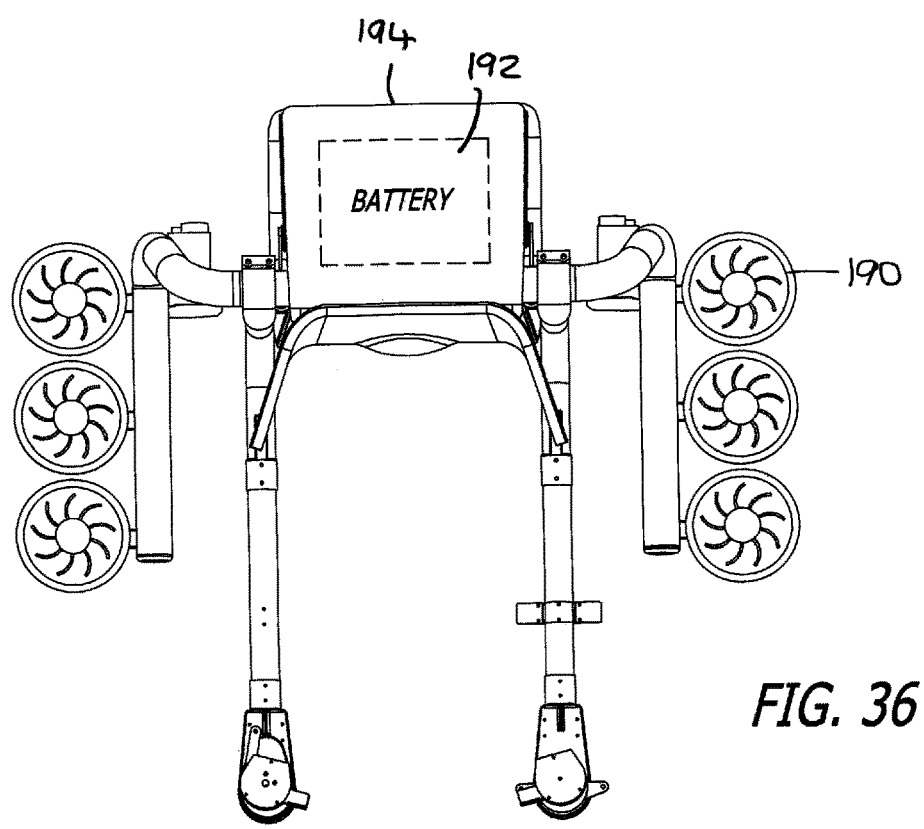
FIG. 36 is a top view of the back mounted flight machine as illustrated in FIG. 35 of the drawings.

FIGS. 35 and 36 show a further embodiment of the flight device in accordance with this invention. In this embodiment, the flight device uses substantially the same type of air frame and control systems as has been described with reference to previous embodiments, but has in place of at least some of the turbine engine jet packs the presence of electric powered motors 190 which spin ducted fans for thrust. Preferably, all of the engines 190 are electric powered motors, although it may be within the scope of certain embodiments of the invention to have a combination of turbine engines and electric powered motors. As will be appreciated, the electric powered motors 190, which spin the ducted fans for thrust, utilize batteries 192 as a power source, and these may be housed in an enclosure 194 which corresponds to the position of the fuel tank as described with reference to previous embodiments. FIG. 35 of the drawings shows a side view of a flight device in accordance with this embodiment of the invention, while FIG. 36 shows a top view of the device. It will be seen that each of the lateral arms of the mainframe has mounted thereon three linearly spaced and adjacent electric powered motors, and shown in these figures are the ducted fans which spin on precision constructed shafts to create the necessary thrust. The battery compartment 194 is at the rear of the frame, and the batteries 192 may be removed and replaced, recharged or otherwise maintained as best dictated by the specific needs and requirements of the situation. Appropriate connections operating between the battery 192 or battery pack and the various engines are provided, and the necessary pilot controls for manipulating and operating the battery power output are provided so that the combined and individual thrust produced by the plurality of electric powered motors can be varied according to the flight context.

Various electric motors of different configuration and size may be used. In this way, a motor having a desired fan swept area, diameter, shaft assembly system, and ducted fans may be utilized. The number and size of the motors which may be placed on a flight device in accordance with the invention may be selectively varied according to the weight of the device and the size and weight of the pilot. Of course, the combined power output of the electric motors must be sufficient to achieve flight status based on the combined weight of the flight device and the pilot. As will be appreciated, the weight of the batteries will not change to any significant extent during the course of the flight as the power of the battery is used to drive the electric motors, so that a battery-operated flight device removes one of the parameters for which adjustments must be made by the pilot as the fuel level and weight of the device drops during the course of a flight in a corresponding turbine engine flight device of the invention.

The drawings in this application with the accompanying text shows several embodiments including preferred embodiments of a back mounted flight machine in accordance with the invention, but he will be appreciated that the invention is not limited to the exact details described, and variations of the invention are permissible within the scope of the claims.

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

The invention claimed is:

1. A back mounted flight machine comprising:
 a frame comprising a connecting bracket, a pair of lateral arms extending from the connecting bracket, and an engine mounted on each of the lateral arms in a selected and variable position;
 a harness mounted on the connecting bracket of the frame and between the pair of lateral arms;
 a fastening mechanism for connecting the harness to the connecting bracket of the frame to permit relative movement between the harness and the frame in a plurality of orientations; and
 a pair of retractable barriers formed between the harness and the engines, the retractable barriers been movable between a first extended position between the harness and the engines, and a second retracted position.

2. A back mounted flight machine as claimed in claim 1 further comprising a retractable post for supporting the flight machine when on solid ground.

3. A back mounted flight machine comprising:
 a frame comprising a connecting bracket, a pair of lateral arms extending from the connecting bracket, and an engine mounted on each of the lateral arms in a selected and variable position;
 a harness mounted on the connecting bracket of the frame and between the pair of lateral arms;
 a fastening mechanism for connecting the harness to the connecting bracket of the frame to permit relative movement between the harness and the frame in a plurality of orientations; and
 a cooling mechanism whereby oil is deposited at bearings within the engine after shut down but before engine rotation has ceased.

4. A back mounted flight machine as claimed in claim 3 further comprising a fuel tank attached to the harness.

5. A back mounted flight machine as claimed in claim 3 wherein each of the pair of lateral arms comprises a control arm to facilitate relative movement between the harness and the frame and a mounting arm for receiving the engine.

6. A back mounted flight machine as claimed in claim 3 wherein each of the pair of lateral arms comprises a control arm and a mounting bracket for mounting the engine on the control arm.

7. A back mounted flight machine as claimed in claim 3 wherein each lateral arm has multiple points for connection of the engine so that the engine may be positioned at a selected and variable point along the lateral arm.

8. A back mounted flight machine as claimed in claim 7 wherein the multiple points for connection comprise a plurality of spaced apertures by means of which the engine can be bolted to the lateral arm.

9. A back mounted flight machine as claimed in claim 3 further comprising an engine mounting bracket for mounting the engine to the lateral arm, wherein the engine is mounted to the engine mounting bracket at one of several mounting positions so that the distance between the engine and the lateral arm can be selectively varied.

10. A back mounted flight machine as claimed in claim 3 wherein the fastening mechanism comprises a pair of vertical brackets within the connecting bracket, a rod rotatably received by the vertical brackets, a fastening plate fixed to the harness, and a rod end having a first end rotatably secured to the rod and a second end connected to the fastening plate.

11. A back mounted flight machine as claimed in claim 3 wherein the relative movement between the harness and the frame in a plurality of orientations includes movement wherein the frame and harness can move in a clockwise and counterclockwise direction relative to each other and in a fore and aft direction relative to each other.

12. A back mounted flight machine as claimed in claim 3 wherein two engines are mounted on each of the lateral arms.

13. A back mounted flight machine as claimed in claim 3 wherein the engines mounted on the lateral arms are turbines which are counter-rotating, rotating in different directions to each other in order to provide stability to the flight machine.

14. A back mounted flight machine comprising:
 a frame comprising a connecting bracket, a pair of lateral arms extending from the connecting bracket, and an engine mounted on each of the lateral arms in a selected and variable position;
 a harness mounted on the connecting bracket of the frame and between the pair of lateral arms;
 a fastening mechanism for connecting the harness to the connecting bracket of the frame to permit relative movement between the harness and the frame in a plurality of orientations;
 a control handle formed at an end of each of the pair of lateral arms, the control handle facilitating engine control and relative orientation between the harness and the frame; and
 the control handle includes an emergency switch for altering engine output, the emergency switch including a tie connectable to a pilot, such that selected movement of the hand of the pilot will cause the tie to activate the emergency switch.

15. A back mounted flight machine as claimed in claim 14 wherein the control handle includes a tab on an outer surface thereof, the tab cooperating with a spring-loaded arm for controlling thrust of the engine.

16. A back mounted flight machine as claimed in claim 14 wherein the control handle includes a rotatable engine control post for controlling engine output.

17. A back mounted flight machine as claimed in claim 14 further comprising a compartment for a stored parachute, wherein the parachute can be deployed in both emergency and non-emergency situations.

18. A back mounted flight machine as claimed in claim 14 wherein the control handle is rotatable and calibrated such that thrust increases at a greater rate during the early stages of rotation of the hand control, and at a lesser rate once the flight device is airborne.

\* \* \* \* \*